(12) United States Patent
McCrary et al.

(10) Patent No.: US 11,928,949 B2
(45) Date of Patent: Mar. 12, 2024

(54) PHONE REMINDER DEVICES, SYSTEMS AND METHODS

(71) Applicant: PROX DEVICES, INC., San Carlos, CA (US)

(72) Inventors: Michael M. McCrary, San Mateo, CA (US); Robert T. Hulet, Pebble Beach, CA (US)

(73) Assignee: PROX DEVICES, INC., San Carlos, CA (US)

(*) Notice: Subject to any disclaimer, the term of this patent is extended or adjusted under 35 U.S.C. 154(b) by 0 days.

(21) Appl. No.: 18/250,208

(22) PCT Filed: Dec. 7, 2022

(86) PCT No.: PCT/IB2022/061900
§ 371 (c)(1),
(2) Date: Sep. 6, 2023

(87) PCT Pub. No.: WO2023/105450
PCT Pub. Date: Jun. 15, 2023

(65) Prior Publication Data
US 2024/0046770 A1  Feb. 8, 2024

Related U.S. Application Data

(60) Provisional application No. 63/265,043, filed on Dec. 7, 2021.

(51) Int. Cl.
*G08B 21/24* (2006.01)
*G08B 21/18* (2006.01)
(Continued)

(52) U.S. Cl.
CPC ............. *G08B 21/18* (2013.01); *H04N 23/66* (2023.01); *H04W 52/0251* (2013.01)

(58) Field of Classification Search
CPC ........ G08B 21/18; G08B 21/24; H04N 23/66; H04W 52/0251; H04W 4/80; H04B 2001/0416
See application file for complete search history.

(56) References Cited

U.S. PATENT DOCUMENTS 5,796,338 A   8/1998 Mardirossian
6,885,848 B2  4/2005 Lee
(Continued)

FOREIGN PATENT DOCUMENTS

WO  WO 2007/107749  9/2007

*Primary Examiner* — Steven Lim
*Assistant Examiner* — Son M Tang
(74) *Attorney, Agent, or Firm* — Charles L. Thoeming

(57) ABSTRACT

Phone reminder device (PRD) apparatus, systems, and methods for pairing with a protected phone include a processor, a memory unit that stores program instructions, a user input device, a Bluetooth low energy radio transceiver, an accelerometer, and an integral power source. PRD processor control routines, including visual feedback and customized auditory alerts, are based on selected modes of method and system operation, persistence of inferred or measured lack of proximity, history and frequency of alerts, current and historical PRD and/or phone movement, historical bases for lack of proximity, and loss of phone connection. User input or separate processor control adjust the transmission power level up with adjusted transmission power level in detecting protected phone proximity saved to the memory unit. Based on user input and PRD system and/or method dynamics, the memory unit maximizes integral power source life. PRD remote control of the protected phone camera application is disclosed.

21 Claims, 19 Drawing Sheets

(51) Int. Cl.
*H04N 23/66* (2023.01)
*H04W 52/02* (2009.01)

(56) References Cited

U.S. PATENT DOCUMENTS

| | | | |
|---|---|---|---|
| 7,535,357 B2 | 5/2009 | Enitan et al. | |
| 7,715,831 B2 | 5/2010 | Wakefield | |
| 7,898,414 B2 | 3/2011 | Spano | |
| 8,467,770 B1 | 6/2013 | Ben Ayed | |
| 9,224,096 B2* | 12/2015 | Oppenheimer | G06N 3/08 |
| 9,979,724 B2* | 5/2018 | Tunnell | H04W 4/70 |
| 10,271,172 B2* | 4/2019 | de Barros Chapiewski | G08B 13/14 |
| 10,726,703 B1 | 7/2020 | La Plante | |
| 10,970,989 B1* | 4/2021 | Quibelan | G08B 21/24 |
| 10,979,862 B2* | 4/2021 | Daoura | H04W 4/38 |
| 11,145,183 B2* | 10/2021 | Daoura | G08B 21/24 |
| 11,195,396 B2* | 12/2021 | Oppenheimer | G06K 7/10326 |
| 2004/0032503 A1* | 2/2004 | Monden | H04M 1/724 348/207.99 |
| 2007/0042714 A1* | 2/2007 | Ayed | G08B 21/0277 455/557 |
| 2007/0129113 A1 | 6/2007 | Klicpera et al. | |
| 2010/0019920 A1* | 1/2010 | Ketari | G08B 21/0213 340/686.6 |
| 2010/0178913 A1* | 7/2010 | Herbert | G08B 13/1427 340/568.1 |
| 2014/0013455 A1* | 1/2014 | Berger | H04W 12/12 726/36 |
| 2014/0089243 A1* | 3/2014 | Oppenheimer | H04L 67/12 706/46 |
| 2014/0173439 A1* | 6/2014 | Gutierrez | H04L 43/10 715/738 |
| 2015/0170496 A1* | 6/2015 | King | G08B 21/24 340/686.6 |
| 2015/0356858 A1* | 12/2015 | Daoura | H05K 5/0086 340/539.32 |
| 2016/0000577 A1 | 1/2016 | DiMauro | |
| 2016/0070900 A1* | 3/2016 | Kim | H04W 12/50 726/3 |
| 2017/0251440 A1* | 8/2017 | Gilson | H04W 52/028 |
| 2020/0083828 A1* | 3/2020 | Willer | F02B 63/047 |
| 2020/0125229 A1* | 4/2020 | Xu | G06F 1/3206 |
| 2020/0128482 A1* | 4/2020 | Daoura | H04W 4/80 |
| 2020/0191896 A1* | 6/2020 | Valencia | G08B 21/0275 |
| 2020/0260287 A1* | 8/2020 | Hendel | G06N 5/04 |
| 2020/0275369 A1* | 8/2020 | Foster | H04W 4/029 |
| 2021/0097841 A1* | 4/2021 | Quibelan | H04W 52/52 |
| 2021/0236376 A1* | 8/2021 | Siegel | G16H 40/67 |
| 2022/0000368 A1* | 1/2022 | Meisal | A61B 5/0008 |

* cited by examiner

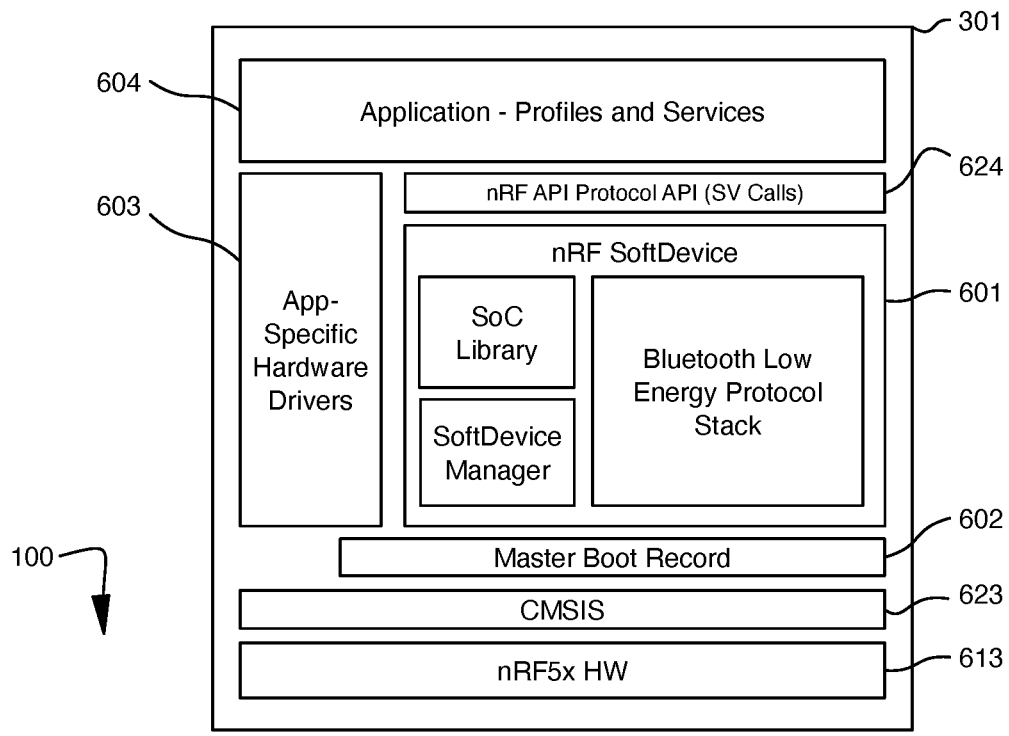
FIGURE 6A
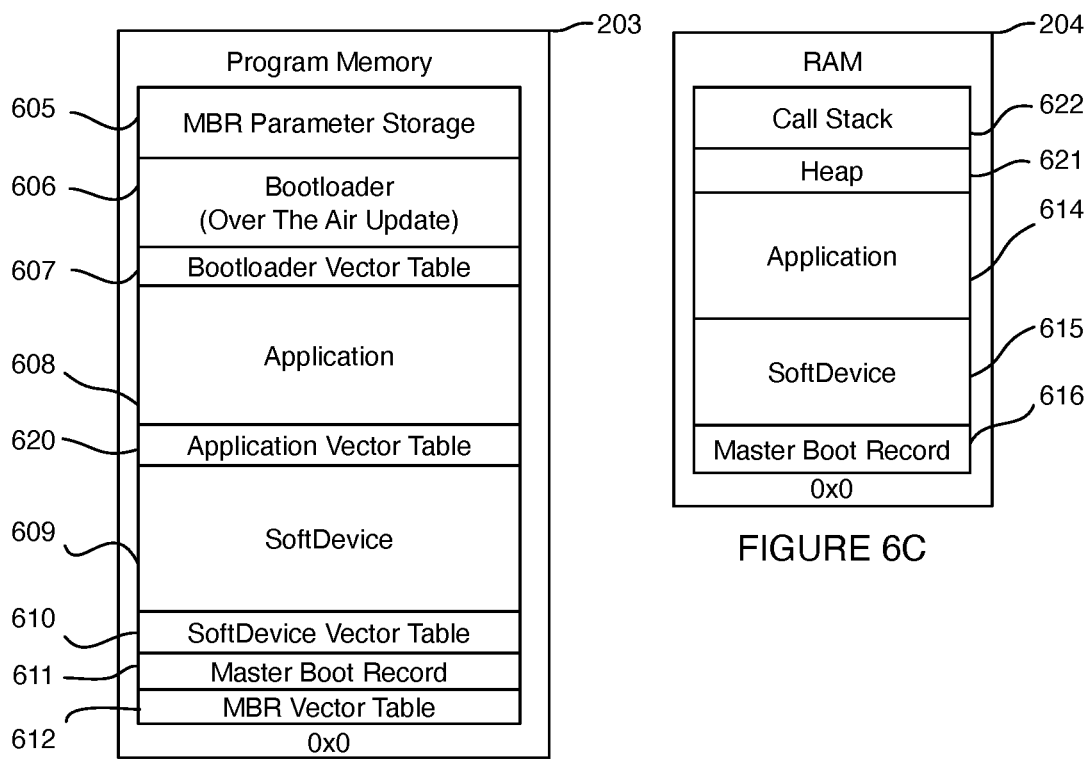
FIGURE 6B
FIGURE 6C

| Description $Z_f$ | Timeout | Connected | Deferred Alert | BLE Turned Off | Movement |
|---|---|---|---|---|---|
| $Z_1$ | - | 0 | - | - | - |
| $Z_2$ | - | 1 | - | - | - |
| $Z_3$ | - | - | - | - | 1 |
| $Z_4$ | 1 | 0 | - | - | - |
| $Z_6$ | 1 | 0 | 0 | - | - |
| $Z_7$ | 1 | 0 | 1 | 0 | - |
| $Z_8$ | - | - | 1 | - | 1 |
| $Z_{11}$ | - | 0 | - | 1 | - |
| $Z_{14}$ | 1 | 0 | - | 0 | 0 |

FIG. 16B

| Description $W_g$ | Alert | Fast Adv. | Slow Adv. | Maintain Connection | Defer Alert | Override | BLE Turned Off |
|---|---|---|---|---|---|---|---|
| $W_1$ | 1 | 0 | 0 | - | - | - | - |
| $W_2$ | 1 | 1 | 0 | - | - | - | - |
| $W_3$ | 1 | 0 | 1 | - | - | - | - |
| $W_4$ | 0 | 1 | 0 | - | - | - | - |
| $W_5$ | 0 | 0 | 1 | - | - | - | - |
| $W_6$ | 1 | 0 | 0 | 1 | - | - | 0 |
| $W_7$ | 0 | 0 | 0 | 1 | - | - | - |
| $W_9$ | 1 | 1 | 0 | - | 1 | - | - |
| $W_{10}$ | 1 | 0 | 0 | 1 | 0 | 1 | 0 |
| $W_{11}$ | 0 | 0 | 0 | - | - | - | 1 |
| $W_{12}$ | 1 | 1 | 0 | - | - | 1 | - |

FIG. 16C ns, SYSTEMS
AND METHODS

CROSS-REFERENCE

This application claims the priority benefit of U.S. Provisional Utility Application No. 63/265,043, filed Dec. 7, 2021, the entirety of each of which is incorporated herein by reference.

NOTICE REGARDING COPYRIGHTED MATERIAL

A portion of this patent document contains material subject to copyright protection and/or copyright registration. The copyright owner has no objection to the facsimile reproduction by anyone of the patent document or the patent disclosure as it appears in the file or records maintained by the United States Patent and Trademark Office, but the copyright owner otherwise reserves all copyright rights.

TECHNICAL FIELD

The present application relates to the design and operation of a proximity alert device and wireless communications between the proximity alert device and a protected device, including techniques for minimizing the proximity alert device power consumption.

BACKGROUND

Some proximity devices exist to actively measure a distance between devices using a radio frequency connection between the devices, and a quantitative measurement of distance and/or loss of signal to determine proximity. Some such devices may be prone to false alerts due to environmental interference, undesired alerts, or lack of alerts at appropriate distances or under specific usage circumstances thereby failing to protect the protected device. Some such devices may consume considerable power when more than a threshold distance from the protected device or not provide an alert promptly, failing to protect the device from loss.

Other proximity devices exist to actively track the position of a protected item by being associated with or affixed to the protected item. Such positional tags, such as electronic tracking devices, create numerous ways for users to track the location of the associated item or associated person. For example, global positioning system (GPS) technology in association with a phone application provides a system which can locate an item of importance (e.g. wallet, laptop computer, pad computer, keys, and so forth) when the tracking device is affixed to the item of importance and in radio frequency communication to the phone via Bluetooth and/or Ultra-Wide Band (UWB), or other by other near field radio frequency communication supported by the phone. Other tracking devices may participate in a social network or Internet of Things (IoT) to be discoverable by other systems (phones, laptops, pads, and so forth) other than the user's phone to help with the recovery of a missing protected item of importance. Such systems provide proactive alerts when a loss of inferred proximity between the tracking device and phone occurs. Some such systems may enable a mode whereby both the phone and device are mutually protected from lack of proximity between them and provide alerts or notifications when more than a threshold distance exists. Some such systems and devices may be prone to false alerts, undesired alerts, or lack of alerts at appropriate distances or under specific usage circumstances thereby failing to protect the protected device. These described devices and systems consume considerable power when more than a threshold distance from the protected device or provide no alert, or an alert too late or too far from the lack of proximity event to be useful, failing to protect the device from being forgotten or lost.

Low-power options for positional tags and proximity alert devices are limited to communicating with nearby objects that may require a user associated with the tracking device(s) to be within close proximity of the positional tags, limiting the usefulness of such devices. For example, the device to provide the protection (proximity alert device, positional or tracking tag), is attached to a keychain (left in place) in one part of a user's home and the phone (protected item) moved to a position beyond the threshold alert distance. Such an instance might frequently occur when a user comes home or prepares for sleeping and puts their keys on a table and connects their phone to a charger in the bedroom beyond the radio frequency communication threshold or ability (range). A proximity alert device having measured or inferred a lack of threshold proximity exists, will alert, although the user not being in proximity may not hear the alert. Even if the user heard the alert, it is meaningless (and unwanted) to prevent a loss of the phone given the usage context and may be a source of annoyance to the user or others sharing the premises. The phone is safely at home and connected to the charger in a known location of typical habit. If, in the morning, the user was to forget the phone connected to the charger (still out of range or threshold distance) and to pick up the keychain attached to the proximity alert device, no alert would be provided as there is no transition from the state of being within proximity (threshold alert distance) to being outside of proximity.

Relative to the form factor of the existing art described above, continuing to reestablish radio frequency connection with more frequent attempts and/or increasing radio power levels requires considerable power. And attempts to decrease power consumption under such circumstances by altering the frequency of attempts to reestablish radio frequency communications or by decreasing radio power levels presents a challenge to the timeliness of reestablishing a radio frequency connection when the proximity alert device and protected device are within proximity.

In the previous examples, a likely alternative scenario is that the phone might be in proximity to the proximity alert device, or positional or tracking device, but the phone is not charging (not plugged in fully or charge not plugged in) as expected. In such a case, there is a significant probability the phone will run out of power and shut off. As there is no radio frequency connection after the phone has powered off, this is interpreted as a lack of proximity by the proximity alert device. Per the previous example, the user would receive an unwanted and misunderstood alert during the night and fail to receive an alert indicating a lack of proximity between the proximity alert device and phone when leaving proximity of the phone with the proximity alert device.

SUMMARY OF CERTAIN FEATURES

The disclosed devices, systems, and methods of the Prox PRD™ ("PRD") provide a user-friendly, Bluetooth short-range phone reminder designed to alert when it is no longer in proximity to the paired protected phone. Once paired, the PRD can be adjusted to longer or shorter distances ranging from approximately 10 feet to approximately 150 feet. The PRD protects user privacy and the paired protected phone power supply by functioning without a mobile application and with no location services tracking the user. The PRD alerts the user before the paired protected phone is lost rather than being a device that searches for or finds the phone after it is lost; thus, alleviating the user of any stress accompanying loss.

Pairing the PRD devices, systems, and methods devices, systems, and methods to the protected phone only needs to occur one time. Simply turn on the PRD and the blinking blue LED indicates the PRD is ready to pair with the phone. It is only during this pairing/bonding period that the blue LED will be blinking on the PRD. In the phone's Bluetooth settings, PRD_XXXX can be selected and paired. The PRD will automatically turn itself off if it is not paired to a phone within 2 minutes.

The PRD devices, systems, and methods will continue to reconnect automatically if returning within proximity of the phone after a separation alert, mobile OS update, or turning the phone's Bluetooth off and then back on. The PRD will only work when the phone's Bluetooth is turned on.

The PRD systems and methods continuously adapt to the user's RF environment through frequency hopping and determine the most robust and stable frequencies for connecting with the phone.

Sometimes and by design, the PRD devices, systems, and methods will not continue to provide in-range or out-of-range proximity protected phone alerts. This circumstance occurs after the PRD has alerted the user that the protected phone is no longer in proximity, and then only after the PRD has not been physically moved for an extended period. An advantage of PRD devices, systems, and methods is the ability to decide when not to alert based on movement and to provide reminder alerts under some circumstances. Another distinguishing PRD feature provides an alert when the PRD is less than a threshold distance from the paired protected phone providing a proximity alert to a user that the phone is nearby when trying to locate the phone. The PRD mitigation of alerts methods prevent false alerts due to temporary radio frequency interference.

In addition, turning Bluetooth off then on via the paired protected phone will not cause disconnect and reconnect alerts respectively on the PRD devices, systems, and methods. Alerts only occur from proximity between the protected phone and the PRD. This feature prevents PRD alerts during automatic iOS or Android software updates, which reboot phones typically scheduled between 1 AM and 3 AM.

Connectivity check between the PRD devices, systems, and methods and paired protected phone is managed by clicking the user input button one time. No LED light on the front of the device indicates the PRD is not turned on. A blue LED light indicates the PRD is on and connected to the phone. A red LED light indicates the PRD is on but not connected to the phone. If the PRD displays a red LED, it will look to reconnect back with the phone more frequently. This is especially helpful to find a disconnected phone. Once connected, an audible reconnection sound is provided by the PRD.

Another feature of the PRD devices, systems, and methods provides remote control of the paired protected phone's camera application. This feature is unique to the PRD because it does not disable the phone's keyboard, and it does not require the PRD to be turned off as with other remote shutter control devices. To use this feature, the user first opens the camera application on the paired protected phone. If the camera application is in "photo" mode, a double-click on the PRD control user input button will activate the phone's shutter and a picture will be taken after a short pause. If the camera application is in "video" mode, a double-click on the PRD control user input button will remotely record a video with a second double-click of the user input button to stop the recording.

The PRD devices, systems, and methods provide five alert distance settings. The PRD can be put into alert distance adjustment mode by quickly clicking the user input button three times. The default is at setting 3, which is represented by three beeps. Once in this mode, a single-click will increment the distance setting, with setting 1 coming after setting 5 in rotation.

Setting 1 (one beep) represents the shortest distance and the reconnect alert will only occur when in immediate proximity of the paired protected phone or once the phone is picked up. Setting 1 has the highest level of sensitivity and may not be the best selection based on the circumstances and the surrounding environment. Setting 5 (five beeps) represents the furthest distance, which allows for freedom to roam around with fewer unneeded alerts.

Typically, the distance ranges will extend from approximately 10 feet to upwards of approximately 150 feet. Once a setting is selected, PRD will automatically lock in that setting (indicated by a confirmation tune) after a few seconds, exit out of the alert distance adjustment mode, and return to normal operation.

Multiple alert tunes encompass a variety of pitches and frequencies, thus allowing those who hear better at certain frequencies to find a suitable audible sound. Some alert tunes may be more practical in loud industrial environments. Selecting different tunes can also be helpful if there are two or more PRDs within the same household or office; however, longer tunes will slightly shorten battery life depending on the average number of alerts received per day.

The PRD devices, systems, and methods can be put into select Alert Tune Mode by quickly clicking the user input button four times. Once in this mode, a single-click will rotate through the tune selection. Once a tune is selected, wait a few seconds and the PRD will automatically lock in that setting (indicated by a confirmation tune), exit out of the Selecting Alert Tune Mode, and return to normal operation.

The PRD devices, systems, and methods can be put into Selecting Home or Travel Mode by clicking the button five (5) times and then holding the button down until a single beep or double beep occurs which indicates the mode. Once in this mode, a single-click will toggle between the two selections: one (1) beep represents Home mode (where the PRD must be moving to alert), and two (2) beeps represent Travel mode (where either the PRD or the phone are moving for the PRD to alert).

Once a mode is selected, wait a few seconds and the PRD will automatically lock in that mode (indicated by a confirmation tune), exit out of the Selecting Home or Travel Mode, and return to normal operation.

In Home and Travel modes, if there is a lack of proximity (separation or disconnection by distance) between the protected phone and PRD, and the PRD has not moved for 15 minutes, it defaults to a low power state. Upon movement, the PRD will either give a separation alert if it cannot connect with the paired protected phone or give a reconnection alert if it is connected to the phone.

If Bluetooth is manually turned off on the paired protected phone, the PRD will disconnect. The next time the PRD is moved, it will give an alert. From that state, it will give no more alerts until Bluetooth is turned back on and the PRD is moved.

The PRD devices, systems, and methods can be programmed to suspend alerts when the quiet time is known, nap mode is a good option. There are four (4) nap mode settings which temporarily suspend alerts for a specified period of fifteen minutes after one beep, thirty minutes after two beeps, one hour after three beeps, and two hours after four beeps. To access these settings, press and hold the user input button down. The PRD can be put into nap mode by releasing the button after hearing one, two, three, or four beeps, but before the PRD turns off. When the button is released, the first five notes of the "Rock-A-Bye-Baby" lullaby tune will play, indicating that nap time has begun. The PRD can be powered off by continuing to hold the user input button down past the four beeps until the power-off sound is heard, and anytime thereafter releasing the user input button.

Each beep represents a different timer for the length of the nap time where the PRD will not alert until either the specified time has elapsed and the PRD is moved, or the button is clicked once. Click the user input button manually if nap time needs to be cut short to return the PRD to normal operation.

BRIEF DESCRIPTION OF THE DRAWINGS

FIG. 6A is a block diagram illustrating additional detail of the exemplary PRD of FIG. 3.

FIG. 6B is a block diagram illustrating additional detail within the non-volatile (permanent) memory of the exemplary PRD of FIG. 3.

FIG. 6C is a block diagram illustrating additional detail within the volatile (RAM) memory of the exemplary PRD of FIG. 3.

FIG. 12 is a page map of the location of FIGS. 12A through 12D and overview orientation description for the same.

FIG. 16 is a page map illustrating the location and orientation of FIGS. 16A, 16B and 16C.

FIG. 16B is a table defining the state machine inputs of FIG. 16A.

FIG. 16C is a table defining the state machine outputs of FIG. 16A.

DETAILED DESCRIPTION

The PRD devices, systems, and methods are more particularly described in FIGS. 1A-17 and the following disclosure.

Figure 1A:
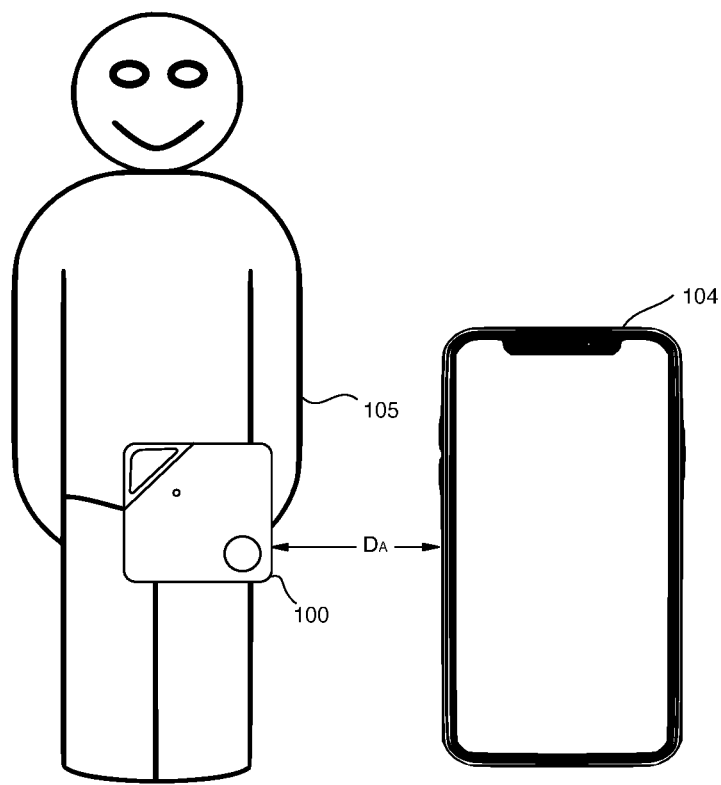
FIG. 1A illustrates an exemplary phone reminder device ("PRD") and a protected phone.

For an exemplary phone reminder device ("PRD") 100 and a phone 104 being used by a user 105, FIG. 1A, the user carries the PRD 100 on or about his person and near the protected phone 104. Distance $D_A$ physically separates the PRD and protected phone. The PRD 100 does not require a protected phone 104 application.

An exemplary PRD 100 can alert the user 105 of proximity or lack of proximity to a protected phone 104 when detected by less than or greater than a threshold distance measured or inferred between the PRD 100 and protected phone 104. Thus, the PRD 100 can assist the user 105 in locating or preventing the loss of the protected phone 104. For example, if the user 105 walks throughout a dwelling with the PRD 100 looking for their phone 104, the PRD will alert the alert user 105 with a sound unique to proximity to the protected phone 104. In another example, a busy user 105 in the morning has the PRD 100 attached to a car key and the distracted user leaves a dwelling without the protected phone 104. An alert is received before the user goes too far, preventing potentially having driven off to work without the protected phone 104. An exemplary PRD 100 is depicted as a small, thin, portable mobile device similar in size to a vehicle key fob which can be attached to a key ring. The reader will appreciate the PRD 100 form factor could be a credit card, jewelry, embedded in glasses, embedded into purses, clothing, or wallets; and the device or methods incorporated in a computer, tablet, fitness monitoring wristband, smart watches, headphones, vehicles (car, motorcycle, or similar transport assemblies), or other proximity alert devices or other electronic equipment.

Thus, the reader will further appreciate the PRD 100 device and methods can be a phone application installed on a non-protected phone to protect a phone 104. For example, a parent utilizing the PRD 100 application on a protected phone can receive an alert when a child and associated protected phone 104 become separated (lack of proximity) in a busy shopping mall and locate the child before it is too late to easily locate them, and the child is lost. In this example, the PRD 100 application could be on multiple phones concurrently such all phones are both a protected phone 104 and PRD 100, and all phones would receive the lack of proximity (separated) alarm. In other implementations or embodiments, the PRD 100 may function as both the PRD 100 and protected device (phone 104) concurrently or as the protected device, with additional PRDs 100 operating in a corresponding way.

As a reader familiar with the art of proximity alert devices might appreciate, the PRD 100 functionality addresses the unique challenges and requirements of a phone reminder system which exceed the functionality of a general-purpose proximity alert device with a corresponding protected phone 104. The PRD 100 can choose not to alert regardless of the proximity or lack thereof, or distance beyond a threshold distance to a protected phone 104 and can base the alert decision on a variety of factors including selected mode of operation, persistence of inferred or measured lack of proximity, history of alerts and frequency, current and historical movement, and historical reason lacking determined proximity. For example, as phones have become more sophisticated the protected phone 104 may have frequent updates, often during the night during non-usage, causing the protected phone 104 to be inoperable and incapable of maintaining a connection to a proximity alert device within distance $D_A$, FIG. 1A, then interpreted as a lack of proximity and causing an unwanted middle of the night alert. If in the example the PRD 100 was substituted for a proximity alert device, the middle of the night alert would not be generated, as the PRD 100 monitors for and changes alert behavior during such situations.

And the PRD 100 has a selectable mode of operation (home mode) which requires the PRD 100 to be moving before an alert is generated when a lack proximity is determined via measurement or inference. In the example, if the protected device phone 104 is incapable due to circumstances, error, or design to indicate its imminent loss of functionality, the PRD 100, while in the home mode of operation, would not alert during the night.

Should the protected phone 104 loss of functionality be persistent, or the PRD 100 moved by the user 105 during the period of loss of functionality of the protected phone 104, the PRD 100 can then alert having deferred the alert and detecting the movement of the PRD 100 by the user 105. The PRD 100 can monitor movement and periodically enable a reminder alert based on lack of movement of the PRD 100 and thereafter movement of the PRD 100. For example, a user 105 awakening in the morning might get dressed and pick up the PRD 100 and be alerted, and upon inspection of the protected phone 104 in immediate proximity to the PRD 100, discover he/she forgot to attach it to the charger and the battery is exhausted and the phone 104 off. Then the user 105 leaves proximity of the protected phone 104 now charging, to sit and eat breakfast. The user 105 having broken their normal routine, and having forgotten about their protected phone 104 charging, now stands to leave for work and receives a reminder alert by the PRD 100 allowing the user 105 to retrieve the now forgotten and charging protected phone 104 before leaving for work.

Figure 1B:
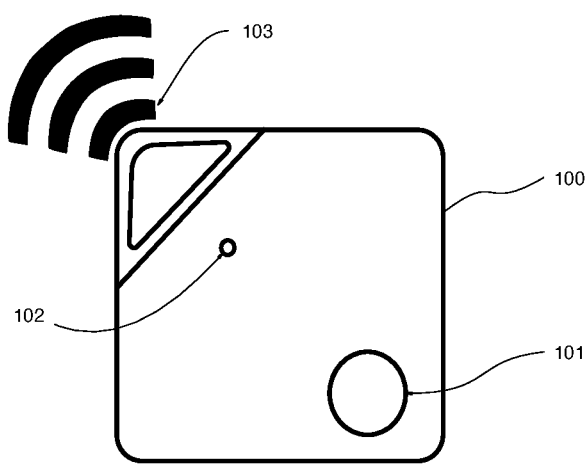
FIG. 1B illustrates an exemplary PRD and additional details.

In one implementation, the PRD 100 includes the user interface items: button 101, indicator 102 and audible alert (sound or tune) 103, FIG. 1B. In some implementations, indicator 102 can indicate powering-on, powering-off, off condition, pairable condition, connected (proximity) or disconnected (lack of proximity) condition, error condition or firmware upgrade mode. In some implementations the PRD 100 may receive user input via the button 101 to power on, power off, mute a low battery alarm, enter and adjust nap mode, or to change configuration options such as alert distance (range), alert sounds or tunes, operating mode ("home" or "travel") or initiate ancillary functions such as remote shutter control or an alert sound on the protected phone 104. In some implementations the PRD 100 may provide audible feedback 103 (e.g., a tone produced by, for example, a piezo element). In some implementations the audible feedback 103 may be a set of unique sounds to provide for a (pleasing) proximity alert and (alarming or only mildly alarming) variety of lack-of-proximity alerts, low battery warning, selecting a configurable option, providing feedback of the configurable option selection process is concluded or has been saved, "nap" mode has been entered, powering-on, powering-off, or that an ancillary function such as a remote shutter control action has been initiated, or a major change of operating mode (e.g. "home" or "travel") has been selected.

The PRD 100 may include other user interface output features (not show) such as haptic (e.g., vibration) or sending messages to a hearing aid or vehicle, or interacting with a braille user interface device, or extra bright visual indicators for a silent mode of operation, or a display capable of displaying text and/or graphics, or another electronic device.

Figure 1C:
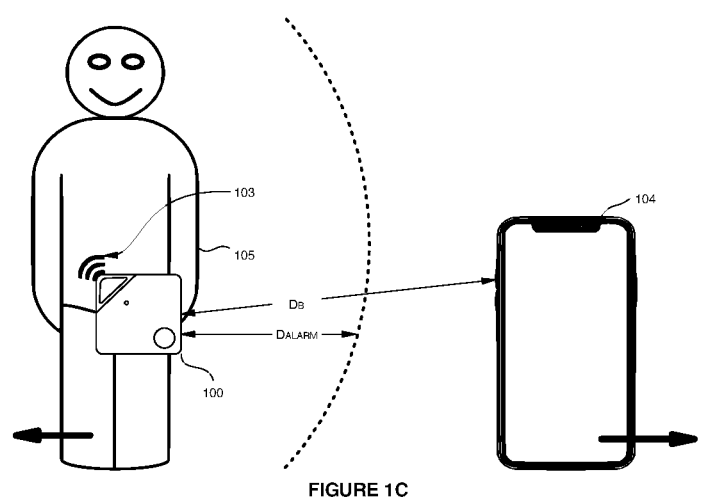
FIG. 1C illustrates an exemplary PRD and protected phone both moving beside each other.
Figure 1D:
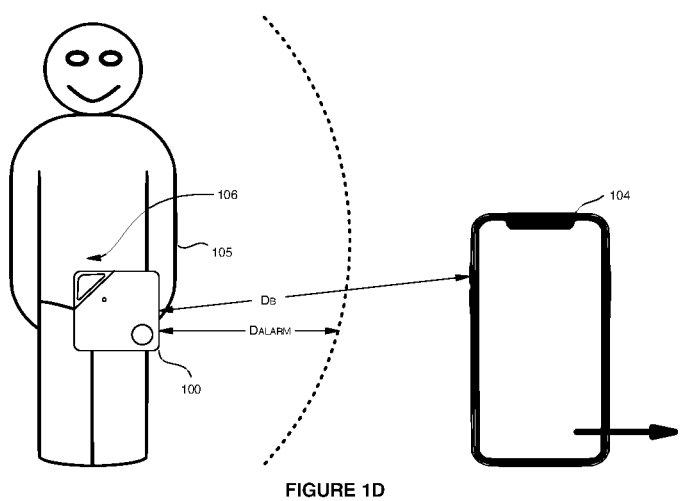
FIG. 1D illustrates an exemplary PRD and protected phone wherein only the protected phone is moving further apart from the PRD.

An exemplary PRD 100 scenario provides a "travel" mode of operation and a protected phone 104 separated by distance $D_B$ that is greater than the alarm distance $D_{Alarm}$, FIG. 1C. As depicted, the PRD 100 can alert 103 the user 105 of the physical separation between the PRD 100 and the protected phone 104. The terms "alarm" and "alert" are used herein interchangeably to refer to a signaling a user proximity or loss of proximity which may be inferred or measured, and by inference or extension, indicate a physical separation amount between the PRD 100 and protected phone 104. Arrows on the user 105 with associated PRD 100, and on the protected phone 104, in association with an alert 103 presence indicate either may be moving to cause an alert. For example, if only the arrow on the protected phone 104 were present, FIG. 1D, but the alert 103 was not present, as indicated by 106, the reader shall interpret the depiction as the PRD 100 will not generate an alert 103 when only the phone 104 has moved to a distance $D_B$ greater than distance $D_{Alarm}$.

Figure 1E:
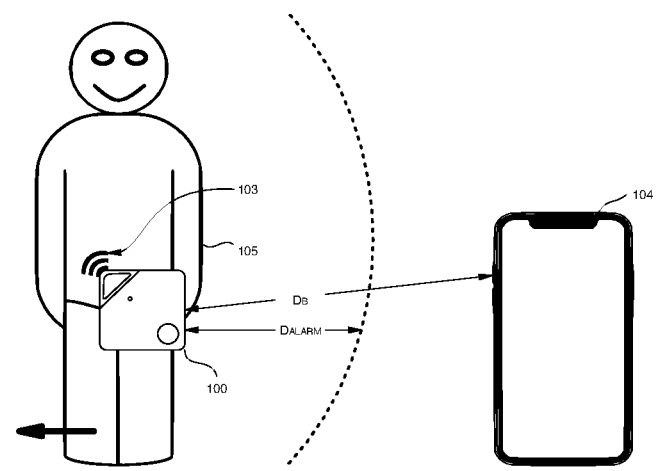
FIG. 1E illustrates an exemplary PRD and protected phone wherein only the PRD is moving further apart from the protected phone.

The PRD 100 must be in user selectable "travel" mode for either the PRD 100 or protected phone 104 to move outside $D_{Alarm}$ distance and cause the PRD 100 to initiate an alarm. FIG. 1E depicts an exemplary PRD 100 with an audible user 105 selectable alert (sound or tune) 103 and in the "travel" mode of operation. If the PRD 100 is in "home" mode, the PRD 100 will not alert 103 without movement of the PRD 100 regardless of the distance $D_B$, inferred or measured.

In some implementations, the specific way the PD 100 alerts 103 the user 105 may include flashing indicator(s), such as indicator 102, haptic (e.g., vibration) not depicted, and/or sending messages to vehicles, braille devices or other electronic device recipients capable of generating an appropriate alert.

The user may employ the PRD 100 to prevent loss or theft of a protected phone 104, such as when traveling or at an airport, by selecting "travel" mode and (possibly but not required) minimum alert distance to receive an alert the protected phone 104 moves away from the PRD 100. When the PRD 100 is in the "home" mode of operation, a user may employ the PRD 100 to prevent forgetting or loss of a protected phone 104 when the user 105 with associated PRD 100 moves outside proximity of the protected phone 104 and receives alert 103.

An exemplary PRD 100 provides a "home" mode of operation with associated user 105 wherein the distance $D_B$ exceeds the alarm distance $D_{Alarm}$ between the PRD 100 and protected phone 104, with only the protected phone 104 moving and the absence of alert 103 denoted by 106 consistent with the "home" mode of operation of the PRD 100.

Two modes of operation of the PRD 100A provide pertinent advantages. For example, a user 105 arriving home when a long day ended might place their purse and attached PRD 100 near the front door as a matter of habit and perform normal end of day domestic duties throughout the home including returning phone calls. Dependent on the size of the home the maximum distance of the underlying radio frequency communication or $D_{Alarm}$ might frequently be exceeded. In "home" mode, the PRD 100 being still and not moving, will not alert regardless of the inferred or measured distance $D_B$, and therefore not alarm the user 105.

Without such a mode of operation utilized in the above example, to not be continuously alerted and annoyed by a proximity protection device protecting a phone, there would be no alternative but to turn the PRD 100 off. If the fact of the proximity alert device being off was forgotten by the user 105 the user might lose their protected phone 104 in a future situation. The PRD 100 solves this problem of user 105 annoyance, increasing the usage of the PRD 100 and associated protection of the phone 104, and decreasing the potential for frustration, loss of time and monies associated with forgetting and subsequent loss of a protected phone 104.

Figure 1F:
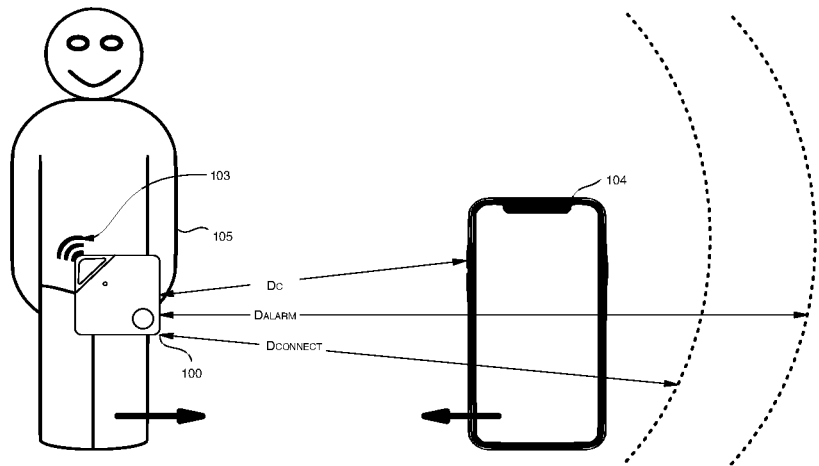
FIG. 1F illustrates an exemplary PRD and protected phone both moving nearer to each other.

An exemplary PRD 100 further provides a "travel" mode of operation with either the user 105 moving with associated PRD 100 and/or protected phone 104 moving as illustrated in FIG. 1F, with the distance $D_C$ between the PRD 100 and protected phone 104 less than both distances $D_{Alarm}$ and $D_{CONNECT}$ causing alert 103 with unique sound associated with the $D_{CONNECT}$. As depicted the PRD 100 alert 103 was initiated and is associated with an inferred or measured proximity between the PRD 100 and protected phone 104. In some implementations there may be no alert 103 associated with a transition from lack-of-proximity to proximity. In some implementations an alert sound unique to proximity may be used for alert 103 to differentiate from the alert sound used for lack-of-proximity or other alert conditions.

A reader knowledgeable in the art of wireless communication and/or proximity alert devices will appreciate the illustration depicts a hysteresis associated with the difference in distance between $D_{Alarm}$ and $D_{CONNECT}$, FIG. 1F. The reader might further appreciate regardless of the radio frequency wireless communication utilized to measure or infer the distance $D_C$ or associated signal to noise ratio ("SNR") a hysteresis must be present to differentiate the distance $D_{Alarm}$ from distance $D_{CONNECT}$. The hysteresis is present in but not limited to PRD 100 implementations which utilize BLE Global Positioning System ("GPS"), indoor GPS, Ultra-Wide Band ("UWB"), Time of Flight ("TOF"), Time of Arrival ("TOA"), or Angle of Arrival ("AOA") to determine distance directly or indirectly between a protected phone 104 and PRD 100, and/or to determine a distance indirectly from differences in locations of the PRD 100 and protected phone 104. For example, a protected phone 104 might broadcast its location and the PRD 100 both receive the protected phone 104 broadcast and positional broadcast information from other sources and measure the difference in locations to determine $D_C$ and utilize a hysteresis value representing some distance corresponding to a value greater than the maximum noise of the underlying technologies.

Figure 1G:
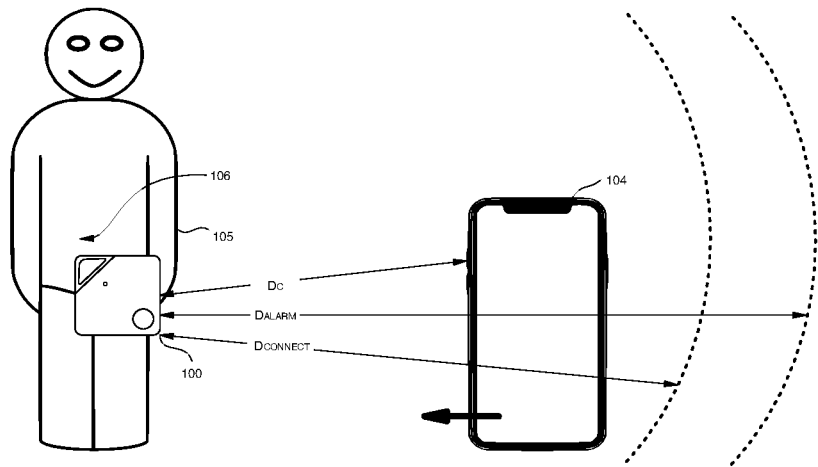
FIG. 1G illustrates an exemplary PRD and protected phone wherein only the protected phone is moving nearer to the PRD.

An exemplary PRD 100 also provides a "home" mode of operation with only the protected phone 104 moving, with the distance $D_C$ between the PRD 100 and protected phone 104 less than both distances $D_{Alarm}$ and $D_{CONNECT}$ without causing alert 103 with unique sound associated with the $D_{CONNECT}$, the absence of denoted by 106 in FIG. 1G.

Figure 1H:
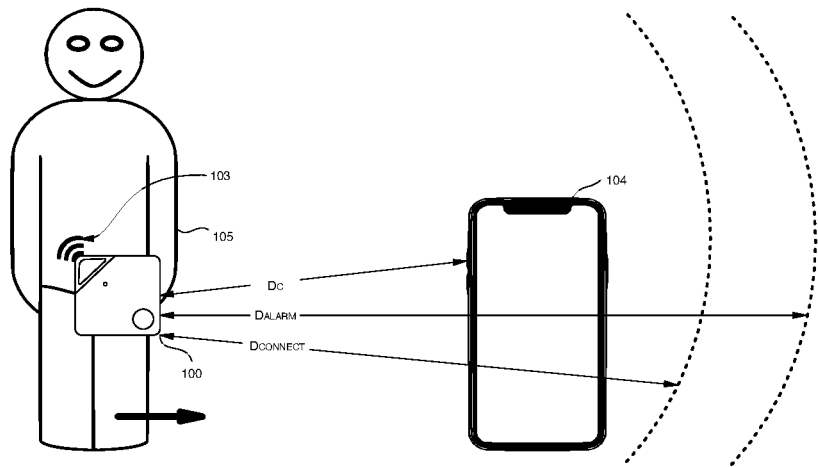
FIG. 1H illustrates an exemplary PRD and protected phone wherein only the PRD is moving nearer to the protected phone
Figure 2:
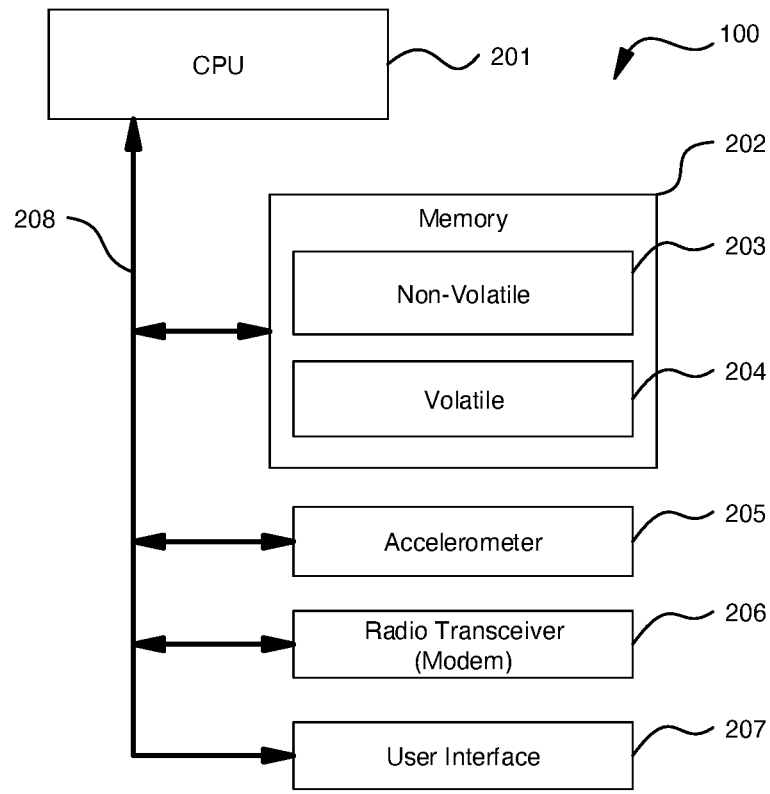
FIG. 2 is a system schematic for central processing unit (CPU) functions for an exemplary PRD.

An exemplary PRD 100 further provides an either "home" or "travel" mode of operation with either the user 105 moving with associated PRD 100 and/or protected phone 104 moving, with the distance $D_C$ between the PRD 100 and protected phone 104 less than both distances $D_{Alarm}$ and $D_{CONNECT}$ causing alert 103 with unique sound associated with the $D_{CONNECT}$, FIG. 1H One implementation of an exemplary PRD 100 provides electronics to implement the disclosed functions, including a CPU 201, memory 202, an accelerometer 205, a radio transceiver 206, and user interface functionality 207, FIG. 2. These components may be coupled in a traditional manner with a bus 208, and the system may be provided with suitable power (not shown), such as a battery appropriately sized and rated for the desired form factor and operating life. For example, some implementations may employ a coin cell; other implementations may employ a rechargeable power source. The memory 202 may include both non-volatile memory 203 (memory that does not lose its data when power is not applied) and volatile memory 204 (memory that requires power to store and retain data). Non-volatile memory 203 and volatile memory 204 may take various forms. For example, non-volatile memory 203 may include one-time programmable (OTP) memory, non-volatile read-only memory (NVROM), erasable programmable read-only memory (EPROM), electrically erasable programmable read-only memory (EEPROM), or other similar memory. Volatile memory may include one or more forms of random-access memory (RAM) or cache memory. In some implementations, volatile memory is faster than non-volatile memory; and in such implementations, program code executed by the system's CPU 201 may be loaded from a non-volatile memory 203 to a volatile memory 204 upon power-up of the system.

The user interface 207 may include various functional components that facilitate receiving user input (e.g., a push-button, such as button 101) or providing output in a user-discernable form, such as visual indications in flashing lights (e.g., via light emitting diodes (LEDs) or other indicators, such as the indicator 102), or haptic or tonal feedback (e.g., alert 103). The reader will appreciate that the user interface 207 may provide other devices including, without limitation, displays, touch sensors, vibration sensors, accelerometers, sensors that detect gestures, or heads-up displays. In some PRD 100 implementations there may be more than one radio transceiver 206, one of which might receive more exact distance information from the protected phone 104 and refine the determined distance between the PRD 100 and protected phone 104 with a signal subject to less interference and encoding additional and more exact distance information within the signal, such as Ultra-Wide Band ("UWB"), but otherwise too power intensive for continuous use.

In some PRD 100 implementations there may be more than one radio transceiver 206, one of which might receive location information other than from the protected phone 104, such as global positioning system (GPS), and determine movement with more accuracy than an accelerometer 205 might provide.

Figure 3:
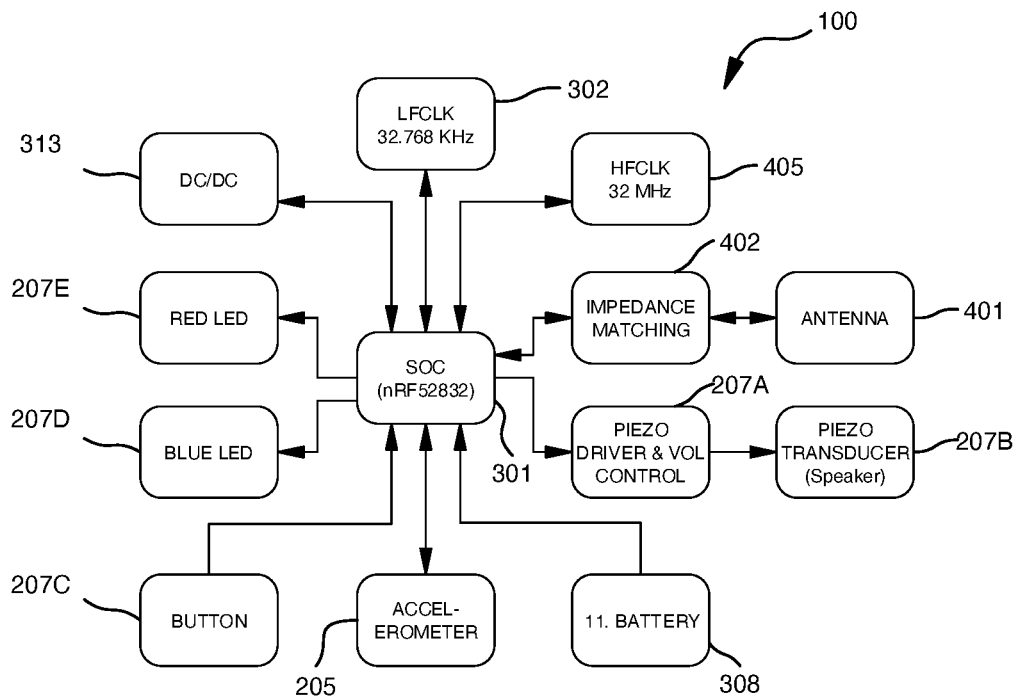
FIG. 3 is a system schematic of an exemplary PRD with additional detail of the hardware functionality with the system on a chip (SOC).

Another implementation of an exemplary PRD 100 includes additional detail of the electronic functional areas CPU 201, memory 202, non-volatile memory 203, volatile memory 204, radio transceiver 206, and bus 208 are incorporated within a system on chip ("SOC") 301, except for the radio 206 portions comprised of antenna 401, impedance matching circuit 402, and high frequency clock ("HFCLK") 405 external to the SOC, FIG. 3. A reader might appreciate in another implementation the accelerometer 205 may be replaced by a gyroscope or other motion sensing and/or position sensing circuit, and/or location sensing circuit.

The PRD indicator 102, FIG. 1, is a single position indicator area illuminated by a light pipe from the LEDs 207D and 207E, FIG. 3, provides blue and red illumination for indicator 102 as part of the user interface 207, FIG. 2. Button 207C, FIG. 3, is the input portion of user interface 207, FIG. 2. Alert 103 is part of the output of the user interface 207, FIG. 2, and comprises piezo driver and volume control 207A, FIG. 3, and piezo transducer element 207B, FIG. 3. The battery (power source) 308, FIG. 3, is conditioned by the DC/DC converter (power supply) 313, FIG. 3, providing power for the SOC 301. The reader might appreciate the user interface 207, FIG. 2, output may include other devices to generate an audible alert such as high-fidelity amplifiers and speaker or speech generation, or a separate radio frequency communication circuit (or device) to communicate to another device to perform the alert 103.

Figure 4:
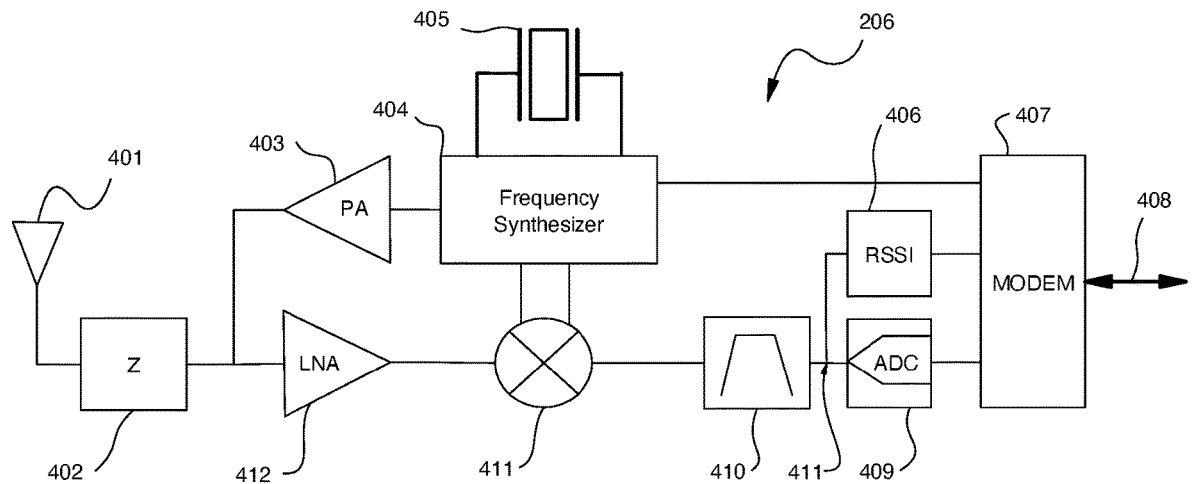
FIG. 4 is a system schematic of a radio transceiver in an exemplary PRD.

An exemplary PRD radio transceiver 206, FIG. 4, includes a frequency synthesizer 404 for generating radio waves of frequencies. The frequency synthesizer 404 may modulate data received via a modem 407, from a bus 408 associated with the system described regarding FIGS. 2 and 3. Data modulated by the frequency synthesizer 404 may be amplified by a power amplifier 403 and transmitted over the air via an antenna 401 after impedance matching through 402. In some implementations no impedance matching circuit 402 is used as all filtering functions are provided by the radio transceiver 206 as incorporated into the SOC 301, FIG. 5.

The antenna 401 may also receive radio signals; amplify them with a low-noise amplifier 412; and filter them through 402 and 410, mixer 411 and a reference signal provided by the frequency synthesizer 404 which multiples HFCLK 405, to generate an information signal 411. This signal 411 may be further processed, such as with an analog-to-digital decoder (ADC) 409.

In some implementations, the information signal 411 includes meta-information about a received signal, such as a signal strength associated with the received signal. Such meta-information may be extracted by an RSSI (received signal strength indicator) block 406 and relayed via the modem 407 to the bus 408 in digital form for processing by the overall system described referring to FIG. 2 and FIG. 3.

In some implementations, the information signal 411 includes meta-information about a received signal including, without limitation, a time of transmission associated with the received signal. Such meta-information is extracted by the equivalent to the RSSI block 406 and relayed via the modem 407 to the bus 408 in digital form for processing by the overall system described referring to FIGS. 2 and 3 to determine the Time Of Flight ("TOF") and therefore the distance the received signal traveled to determine the distance between the PRD 100 and the protected phone 104.

In some implementations, Received Signal Strength ("RSSI") information is not used to generate alerts that flag a less-than-threshold distance or greater-than-threshold distance between a PRD 100 and a protected phone 104; rather, transmission power levels are modulated by the power amplifier 403 to configure a distance over which a connection can be maintained between a PRD 100 and a protected phone 104. An exemplary method of modulating transmission power level is described in FIG. 10.

Figure 5:
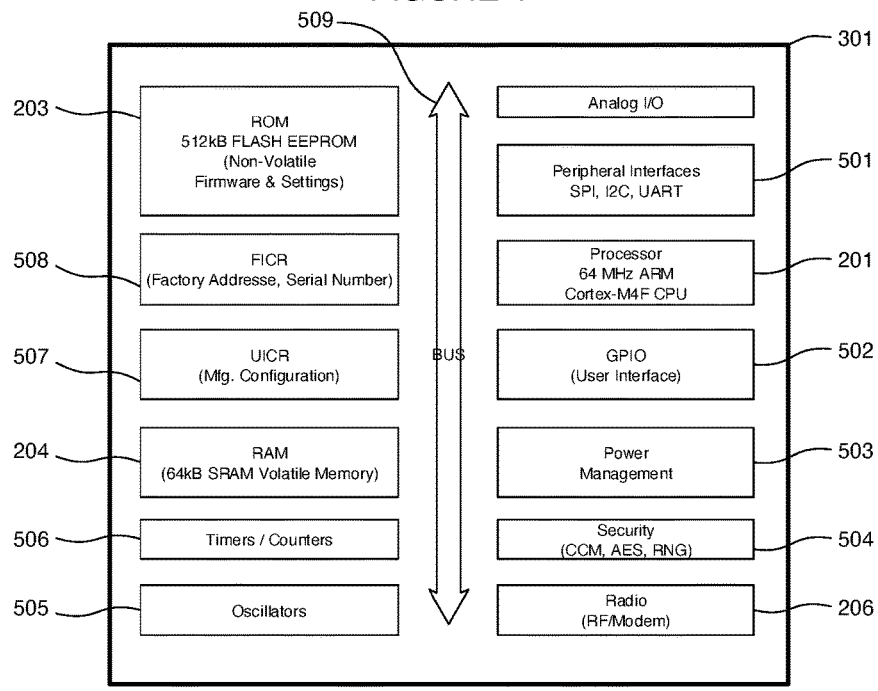
FIG. 5 is a block diagram illustrating additional hardware detail of the system on chip (SOC) of the exemplary PRD of FIG. 3.

Additional details of the SOC 301 within an exemplary PRD 100 wherein the user interface 207 components piezo driver 207A, button 207C, blue LED 207D and red LED 207E are controlled by the CPU 201 per programming instructions persistently contained in 203 non-volatile memory operating on data within volatile memory 203 via the General-Purpose Input Output ("GPIO") 502, FIGS. 5, 6B and 6C. A reader will appreciate the interface 501 to the accelerometer 205 supports multiple bus types and may support communications with another SOC incorporating other radio transceivers, FIGS. 3 and 6A.

In some PRD 100 implementations there may be more than one radio transceiver 206 which might receive more exact distance information from the protected phone 104 and refine the determined distance between the PRD 100 and protected phone 104 with a signal subject to less interference and encoding additional and more exact distance information within the signal, such as Ultra-Wide Band ("UWB"), but otherwise too power intensive for continuous use.

Figure 7:
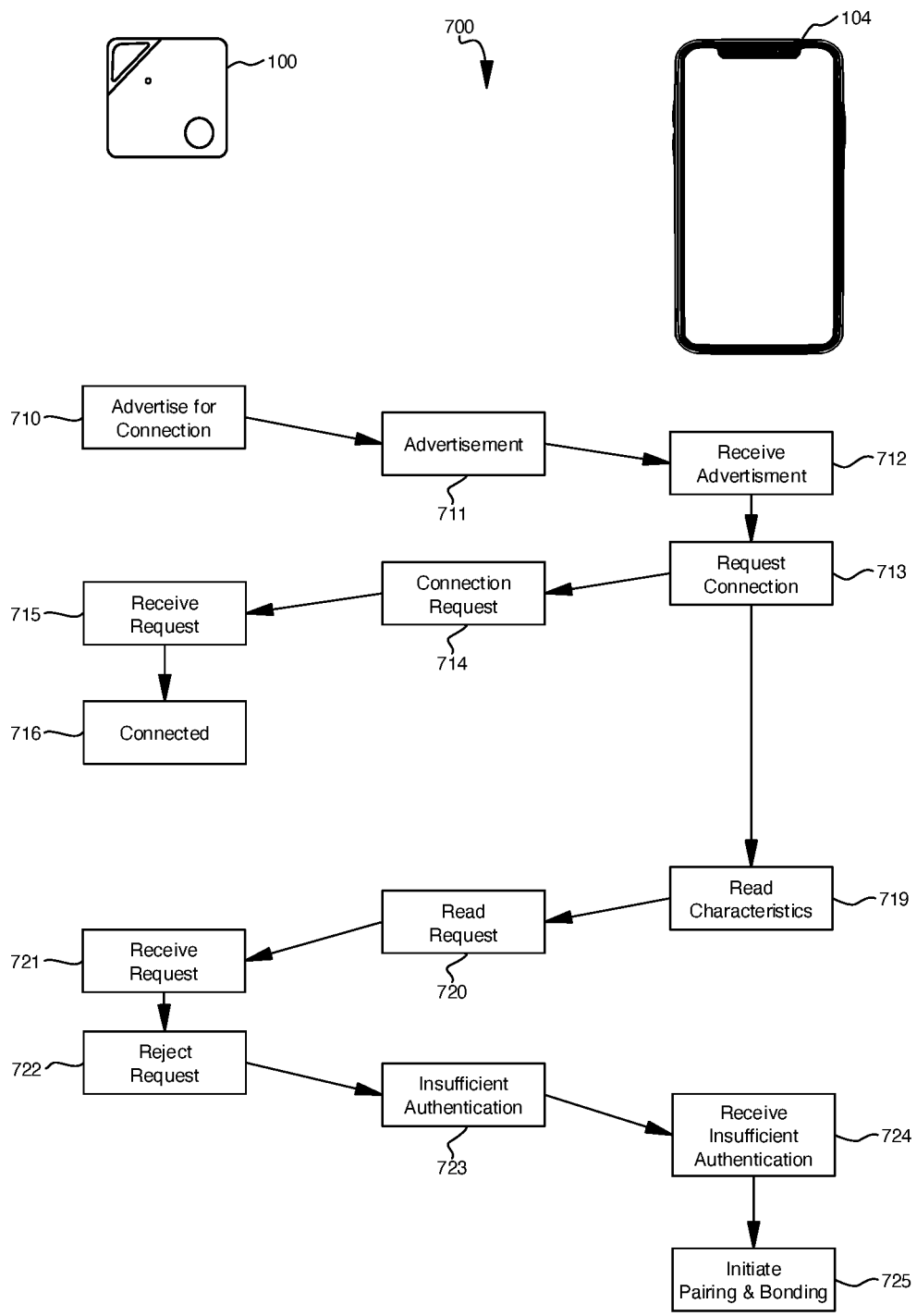
FIG. 7 is a swim-lane diagram illustrating an exemplary method of pairing a PRD and a phone.

An exemplary PRD method 700 of the PRD 100 and a protected phone 104 provides a persistent and continuous radio frequency communication relationship utilizing Bluetooth Low Energy ("BLE") pairing (and bonding), FIG. 7. The PRD 100 is the device advertising its BLE service (Human Interface Device, "HID") and name ("PRD-XXXX") 710 encoded in the BLE communication Packet Data Unit ("PDU") 711. The physical proximate device in this diagram, the protected phone 104, is actively scanning for the advertisement of HID services and receives PDU 712, requests connection 713 resulting in BLE PDU 714. The PRD 100, having successfully received PDU 714 in block 715 requesting a connection between the PRD 100 and protected phone 104, enters a connection state 716. The protected phone 104, having sent the connection request PDU 714, is now in a state of connection.

A reader knowledgeable in the art of Bluetooth Low Energy (BLE) will appreciate FIG. 7 does not show the standard BLE discovery by the phone 104, and does not show discovery of the BLE HID service, or ancillary services required by Bluetooth SIG standard specification to be present within the PRD 100 when the BLE HID service is present, per the "HID Over Gatt Profile" ("HOGP") Bluetooth SIG organization profile standard ("HOGP_SPEC", version V10R00).

After such discovery (not shown) the protected phone 104 initiates reading the BLE information (characteristics) within the assorted services (not shown until 719) by BLE data read PDUs. The phone 104 initiates a read of the "Report Map" characteristic data 719 by sending data read request PDU 720. The PRD 100, having received the read request 721, rejects the request 722 by sending a data read response PDU indicating insufficient authentication (authorization) 723. The protected phone 104, having received the insufficient authentication PDU 724, initiates the BLE pairing and bonding process 725 and creates a persistent BLE relationship with the PRD 100.

A reader knowledgeable in the art of BLE communications will appreciate the method of BLE pairing and bonding after block 725 (not shown) is not unique to the PRD 100 as the method and functionality are both standardized and typically implemented by the BLE SOC vendor supplied BLE Open Systems Interconnection ("OSI") lower layers, such as the BLE link-layer and physical layer. Such vendor supplied layers are certified in conformance with the BLE standards by the SOC vendor and are not modifiable by a device implementor. For example, referring to FIG. 6A, Nordic Semiconductor provides a "nRF SoftDevice" 601 utilized in an exemplary PRD 100 implementation and unmodifiable by other than Nordic Semiconductor.

Once devices 100 and 104 have exchanged encryption information (tokens) and BLE addresses resultant from completing pairing and bonding, and the PRD 100 (and phone) having stored such in non-volatile memory 203, a trusted and persistent communication channel is established, and this channel may be reestablished if a disconnect occurs or power cycle. In some implementations, the successful exchange of tokens and BLE addresses may be recorded by an entry on a whitelist (e.g., an entry of an identifier associated with either the PRD 100 or the phone 104). The PRD 100 and protected phone 104 have formed a BLE piconet which may consist of multiple PRD 100 paired to a protected phone 104.

A reader knowledgeable in the art of wireless communication might appreciate other PRD 100 implementations may employ other standards or protocols, such as those using UWB or ZigBee, or proprietary protocols to form a persistent wireless relationship with a protected device such as a phone 104, or other type of device to be protected. Other PRD implementations may utilize additional or alternative radio transceivers in support of other wireless communication standards and protocols.

A reader might further appreciate some PRD 100 implementations need only receive a minimum of information via radio frequency communication from a device to protect the device such as a wireless communication address or identification token to uniquely identify the device and periodic wireless communication transmissions by the device. In some embodiments of the PRD 100, a protected device need have only a radio frequency transmitter compatible with the PRD 100 radio transceiver 206 (FIG. 2) and transmit periodic information consisting of an address or other unique token identifying the protected device to the PRD 100.

Figure 8:
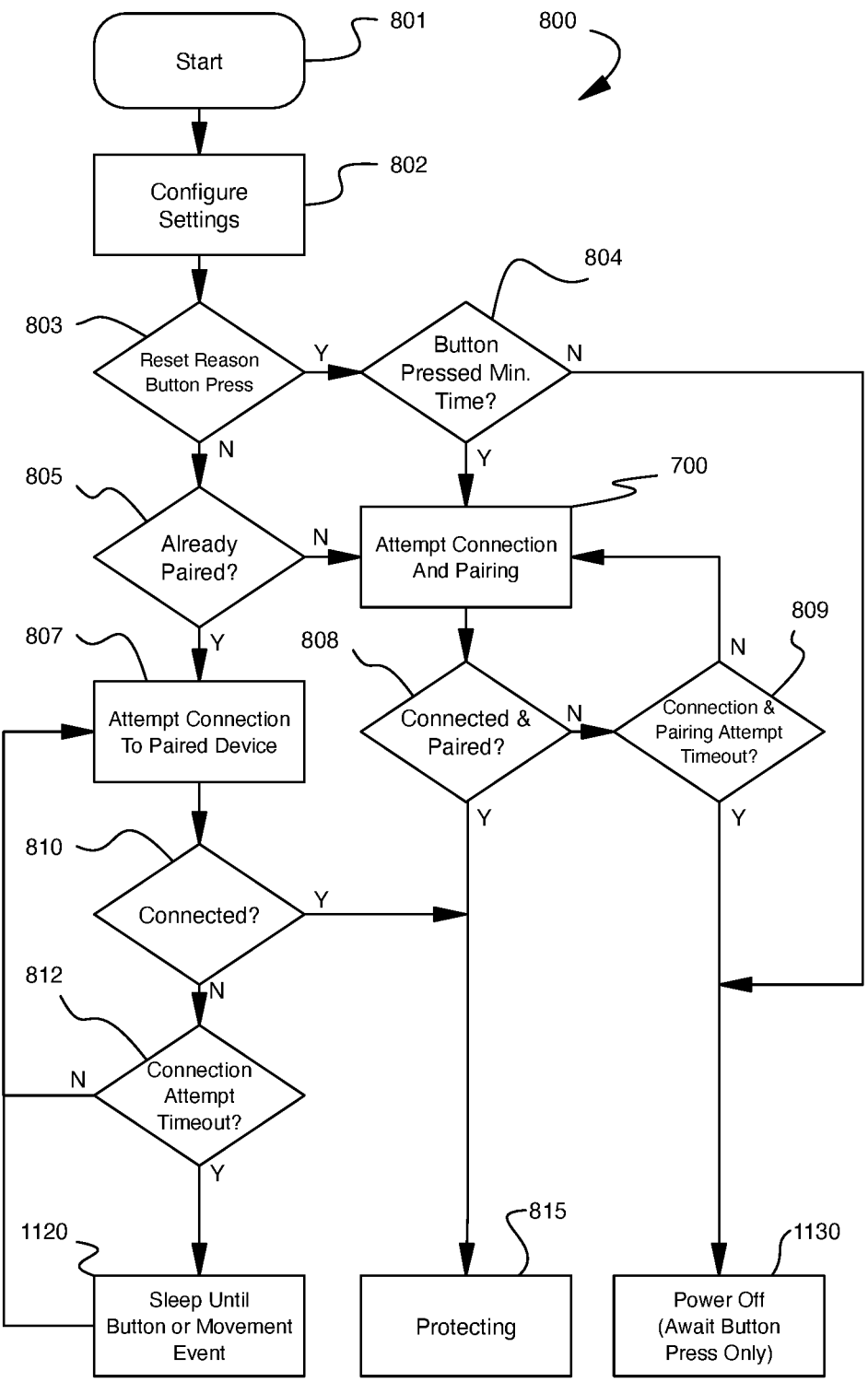
FIG. 8 is a flow diagram of an exemplary method of turning on the PRD for pairing with a phone or replacement (new) phone.

An exemplary PRD method 800, FIG. 8, provides turning the PRD 100 on (power on) while protecting against accidental turn on, for example during shipping, and initiating method 700, FIG. 7, for BLE pairing to a new or replacement protected phone 104. And the method 800 provides security against unwanted phones pairing and provides a second level of protection against accidental power on by returning to a low power 1120 or power off 1130 (deep sleep state) should a protected phone 104 or a phone to be protected (104) respectively not be in the immediate vicinity (proximity).

A reader skilled in the art of embedded systems or general programming may appreciate for illustration and understanding, the FIG. 8 flow diagram (and other diagrams and functional blocks) does not include all detailed perform-some-action, wait-for-condition, perform-respective-action, sleep-for-some-time type loops present within functional blocks, such as 700 and 807.

Figure 9:
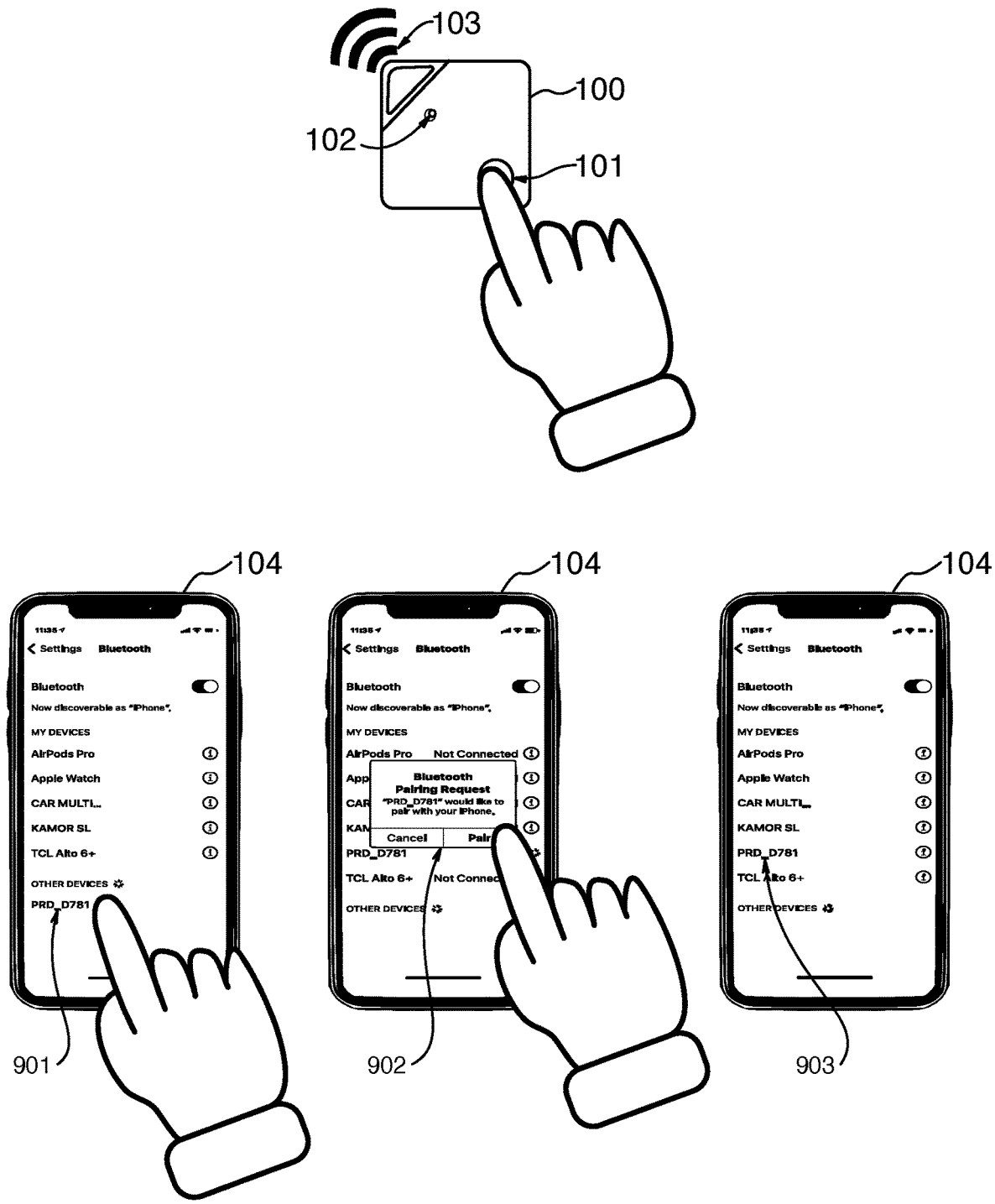
FIG. 9 illustrates additional detail of an exemplary method of pairing a PRD and a phone.

In FIG. 8, start block 801 is entered by either a CPU (201, FIG. 2) reset, or a button press of the PRD 100 button 101 (FIG. 1B) by user 105 (FIG. 1A) finger actuation, FIG. 9. Default information is restored (802) from non-volatile memory 203 (FIG. 2) if no previous turn-on of the PRD 100 and pairing to a protected phone 104 has occurred. Otherwise, saved configuration information, FIG. 12D, and pairing information such as encryption information (token) and protected device addresses associated with protected phone (s) (104) is restored from non-volatile memory 203, FIG. 2.

If the reason for the PRD 100 start (801) is a press (actuation) of the button 101, the button 101 must continue to be pressed for some minimum time 804 to distinguish from a momentary and accidental activation, such as when dropped during shipping or bumped during packaging. In this exemplary implementation the time value 804 is 3.0 (three) seconds but could be 2.9, 10, 2.99999 seconds or any value from an infinite amount of time values sufficient to distinguish between a button 101 being bumped and an intentional actuation by the user 105, FIG. 1. If 804, the button 101, FIG. 1, is not pressed for a minimum time, the PRD 100, will enter initiate a power off 1130. A reader knowledgeable in embedded systems and/or BLE SOC programming will appreciate block 1130, FIG. 8, is using the nomenclature "Power Off" which follows the user 105, FIG. 1A, understanding of the state of the PRD 100 although the power is never physically interrupted within the device.

Referring to FIG. 5, the PRD 100 implementation utilizes the SOC 301 power management 503 during "power off" (method 1130 FIG. 11 encompassed in block 1130 FIG. 8) to put the PRD 100 into a deep sleep state (power conserving state) which encompasses putting sensor devices such as the accelerometer 205 (FIG. 3) into a "power-down" state, and idling, disabling or disconnecting power to all non-essential circuitry within the SOC 301, including, without limitation, portions or all of RAM 203, Security 504 and radio 206 associated with BLE, peripheral interfaces 501. The PRD 100 exists in a very minimum power consumption state ("deep sleep") monitoring the button 101, FIG. 1B, via the GPIO interface 502, FIG. 5, for a change of status (button press), and if present start 801.

Referring to FIG. 8, in some PRD 100 implementations, a power on condition from a reset or power connection determined in block 803 (battery insertion or replacement or reset) may initiate attempting connection (807) to an existing protected phone 104 or connecting and pairing 700 with a new or replacement protected phone 104. Establishing a connection to protected phone 104 or new protected phone 104, within block 700, is performed by a short time period of intensive BLE advertising 711, FIG. 7, with whitelist for connection to a paired phone and after a short while, then restarting advertising at a fast but slower than intensive interval ("fast" advertising) for connection to any phone (without whitelist) for a period of time, followed by even less intensive advertising ("slow" advertising) until timeout 809 at which point power off 1130 is initiated.

A reader may appreciate once the PRD 100 is paired to a protected phone 104, the flow diagram decision block 805 prevents pairing 700 with another phone during normal function (usage), or after power on due to a battery replacement or reset of the PRD 100, as a security measure, by only allowing connection 804 to existing protected phones 104 in the whitelist. Therefore, without the user 105, FIG. 1A, intentionally turning the PRD 100 off, FIGS. 12A and 12B, and then on again via the button 101, FIG. 1B, the PRD 100 will not pair with another phone.

If the attempted connection 807 or connection and pairing 700 between the PRD 100 and protected phone 104 succeeds 810, the PRD 100 will enter a normal state of maintaining a connection and protecting the protected phone 104. In the exemplary PRD 100 implementation utilizing BLE, method 1300, FIG. 13A, describes the communications of an ongoing BLE connection between the PRD 100 and protected phone 104. If the PRD 100 is already paired 805 to a protected phone 104, and attempts to reestablish a connection 807 between the PRD 100 and protected phone 104 unsuccessfully 810, and repeatedly for some period of time, as determined by a connection attempt timeout 812, the PRD 100 will stop attempting to connect 807 and enter a low-power state 1120 awaiting either a button 101, FIG. 1B, event or a movement event generated by the accelerometer 205, FIG. 2.

An exemplary PRD method of pairing a PRD 100 to a phone 104, FIG. 9, to be protected referring to FIG. 7 and FIG. 8. In the implementation depicted, both devices are turned on, the PRD 100 via the method described in FIG. 8 which included the user 105, FIG. 1, actuating the button 101, FIG. 1B, and the phone 104 via whatever method is appropriate to the phone. For the PRD 100 this may involve user feedback via the user interface 207, FIG. 2, through temporary illumination of the indicator 102, FIG. 1B, and playing a unique power-on sound via the audible feedback 103, FIG. 1B. Similarly, the phone 104 is powered on and configured to initiate connections with other devices. In the implementation shown, this involves activating a Bluetooth interface to enable pairing with other Bluetooth devices. As shown, the phone 104 has detected a device available for pairing—, "PRD_D781"—and has so indicated this with indication 901.

In some implementations, including the one depicted in FIG. 9, user selection of the indication 901 causes a security protocol to be executed as part of the pairing such as a confirmation dialog window 902 appearing and requiring the user confirm by selecting the "pair" indicator (touchscreen button) area, are added to the list of my devices 903.

Internal to the phone 104 and the PRD 100, selection of the "pair" confirmation may cause BLE Link Layer ("LL") security (encryption and authentication) to be initiated. Within the PRD 100, utilizing the vendor supplied and certified firmware 601, FIG. 6A, link layer security, the actions of encryption and authentication are accelerated and partially executed by non-CPU hardware within the SOC 301, FIG. 5), in the security function 504, FIG. 5, of the integrated circuit. After security is completed (tokens exchanged) a persistent connection is established as indicated on the now protected phone 104 via the display (indication) 903 ("PRD_D781") within the list of connected devices, 903.

Figure 10:
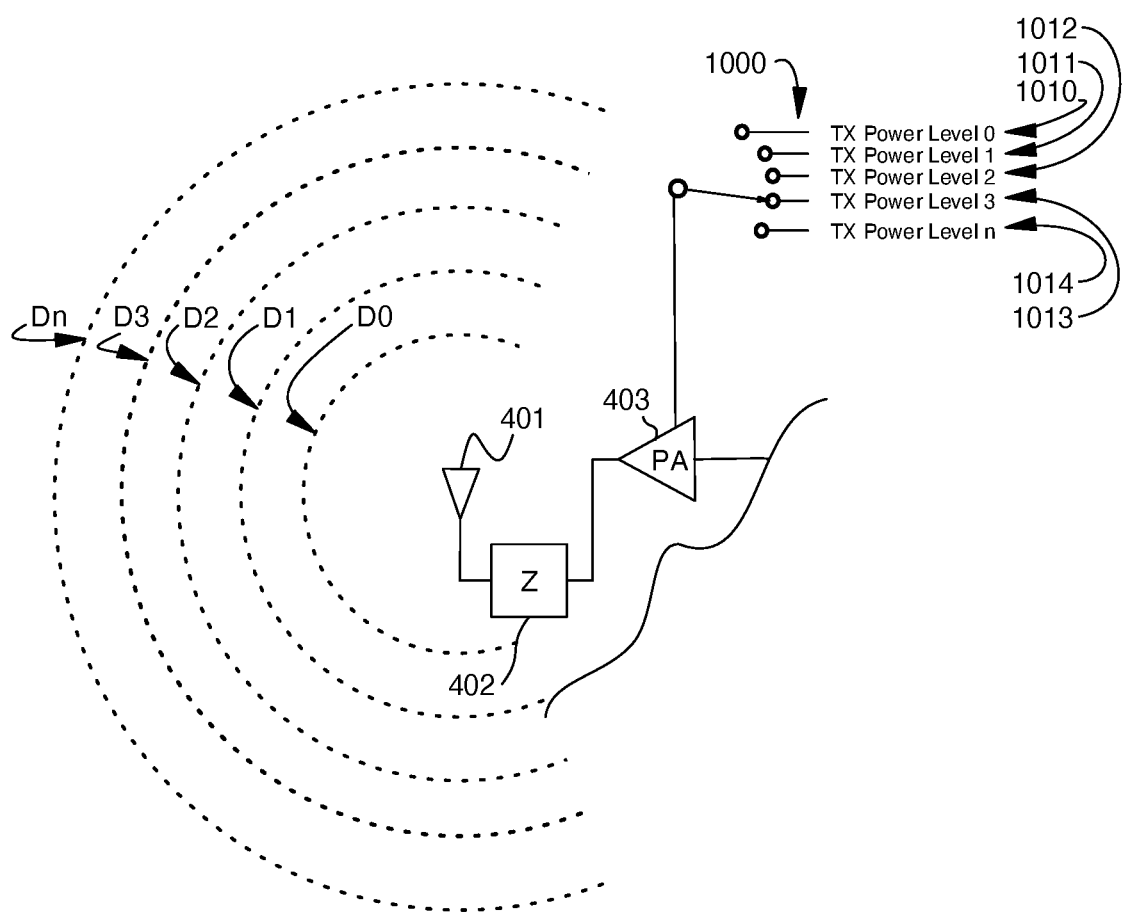
FIG. 10 illustrates additional detail of the exemplary radio transceiver of FIG. 4.

Additional detail of an exemplary radio transceiver 206 is provided in FIG. 10. Specifically, the power amplifier 403 may be configurable to amplify a received signal for transmission via the antenna 401 at one of a plurality of different power levels (e.g., gains). For example, in one implementation, a selector 1000 selects among a plurality of different amplification levels, or power levels, at which a signal at the power amplifier 403 amplifies an outgoing signal. The power levels may correspond to a peak current at which the power amplifier 403 drives a signal to the antenna 401. In some implementations, the power levels range from less than a milliwatt ("mW") to low single-digit milliwatts, such as, in one example 0.0001 mW to 2.5119 mW. In another example power levels range from a single milliwatt to triple-digit milliwatts—such as 1.0 mW to 100 mW. The power levels may be specified in other units—such as decibel-milliwatts (dBm). In another implementation the power levels range between −33.6 decibel-milliwatts (dBm) and 14 decibel-milliwatts. In another implementation, the power levels range between −40 dBm and +4 dBm.

The power levels may also be specified in units of distance, such as meters (m) or feet (ft) over which a connection can be reliably made, in a typical environment free of significant radio wave interference or obstructions. In some implementations, the power levels correspond to distances of <1 m to over 50 m, or less than 1 ft to over 100 ft.

In some implementations, there may be five power levels, and the PRD 100 may be configured to employ the middle power level. In other implementations, there may be many more different power levels, such as four, eight, sixteen; and the PRD 100 may be configured to employ an intermediate power level, such as power level 3 in a system with 5 power levels between 0 and 4. Although the selector 1000 is depicted as a mechanical switch, the reader will appreciate this selector 1000 may be implemented electronically, such as by a control bit in a configuration register written by computer code executed by the CPU 201. This bit may be written, or the power level configured, in an initial power-up sequence, or written with a different power level dependent on the state of the PRD 100 (connected or not connected). Regardless of how the power levels are specified in various implementations, different power levels correspond to different distances over which a reliable connection can be made. For example, a TX Power Level 0 (1010) may correspond to a distance over which a PRD 100 and a protected phone 104 can be reliably connected; a TX Power Level 1 (1011) may correspond to a distance $D_1$; a TX Power Level 2 (1012) may correspond to a distance $D_2$; a TX Power Level 3 (1013) may correspond to a distance $D_3$; a TX Power Level n (1014) may correspond to a distance dn. Thus, through selection by the selector 1000 of the power level of the power amplifier 403, a distance can be configured over which a connection can be maintained between a PRD 100 and a protected phone 104.

Figures 11A, 11B:
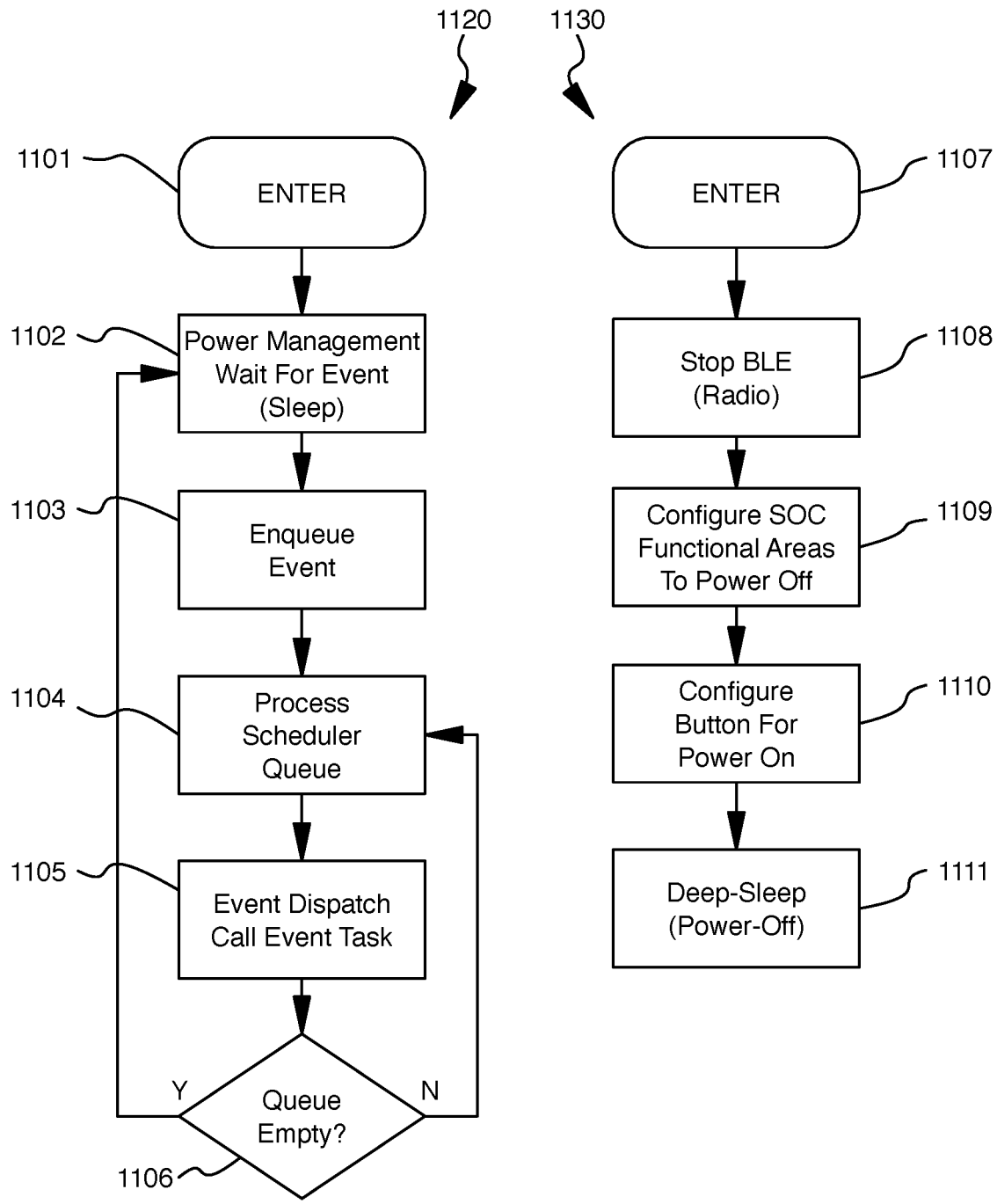
FIG. 11A is a flow diagram an exemplary PRD software method of processing and distributing events and conserving power (sleep).
FIG. 11B is a flow diagram of an exemplary PRD software method of power off into a deep sleep while awaiting a user interface input.

An exemplary PRD method of queuing and dispatching events to specific portions of the PRD 100 application (ISO application layer) firmware 608, FIG. 6B, when no event is queued for processing to enter a low power state 1102 via the SOC 301, FIG. 5, integrated power management 503 saving considerable power and in some implementation lengthening battery life, is depicted in FIG. 11A. The loop is initially entered during initialization via the enter 1101 (start).

To a reader knowledgeable in the art of embedded systems it will be appreciated this is more efficient than implementations utilizing a polling loop; sleep until timer expiration, look for a condition, if condition true—execute computer instructions, return to sleep. The implementation using the PRD 100 integrated power management 503 consumes little power until the condition exists and does not enable the CPU 201, FIG. 5.

When the PRD 100, SOC 301, FIG. 5) recognizes a condition, for example button 101 (FIG. 1B) being actuated via the General Purpose Input Output ("GPIO") 502 (FIG. 5) interface, the power management 503 (FIG. 5, enables the CPU 201 and other SOC 301 functions which have been programmatically configured to be available and begins execution at 1103 stored in the application area of the non-volatile memory 608, FIG. 6B. The event is put into a queue 1103, the queue processed 1104, and the appropriate function (task) called 1105. The task (not shown) once having completed processing returns to 1105 and determines if there are other events to process 1106, the process is repeated. If there are no other events to process 1106, the PRD 100 returns to sleep 1102.

An exemplary PRD method of putting the PRD 100 in a deep power conserving sleep is depicted in FIG. 11B. Once entered 1107, the radio 206, FIG. 5, is turned off. In some implementations such as using BLE, a PDU (message) may be sent indicating the PRD 100 is powering off. The PRD 100 programmatically configures the SOC 301, FIG. 5, power management 503, FIG. 5, to turn off unneeded portions of the SOC 301 such as most of RAM 204 and Peripheral Interfaces 501. The SOC 301 is configured to only awaken on button 101, FIG. 1B, actuation via GPIO 502, FIG. 5, and then powers off. On button 101, FIG. 1B, actuation by the user 105, FIG. 1, power management 503, FIG. 5, enables the SOC 301 including CPU 201, FIG. 5, and begins execution at start point of the PRD 100 firmware application 608, FIG. 6B, via the bootloader vector table 607 reset vector linked to the application vector table 620.

Figure 12B:
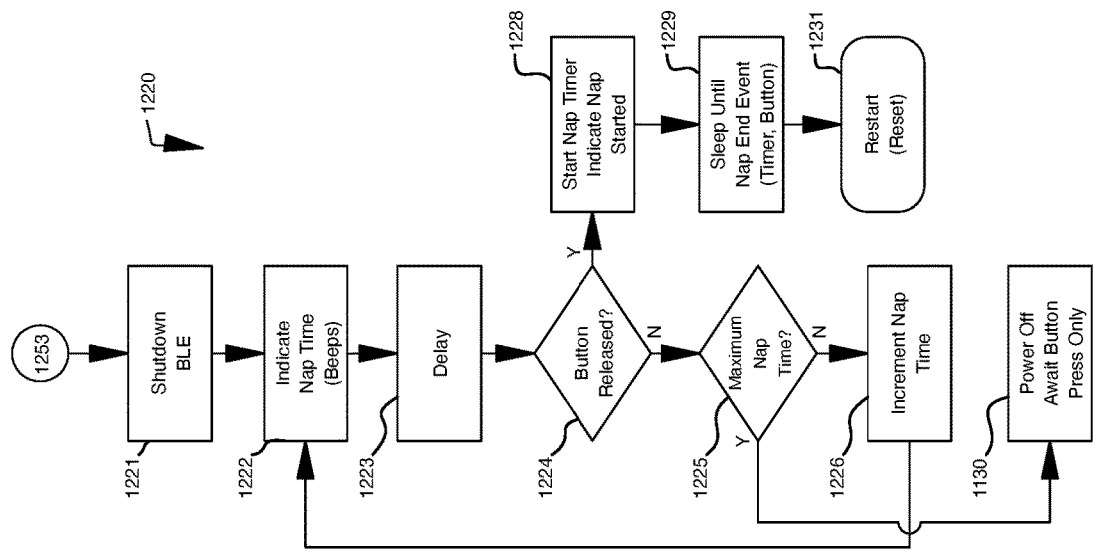
FIG. 12B is a flow diagram of an exemplary software method of using a single user interface button on an exemplary PRD to select and initiate a variable "nap" time or to power off.
Figure 12A:
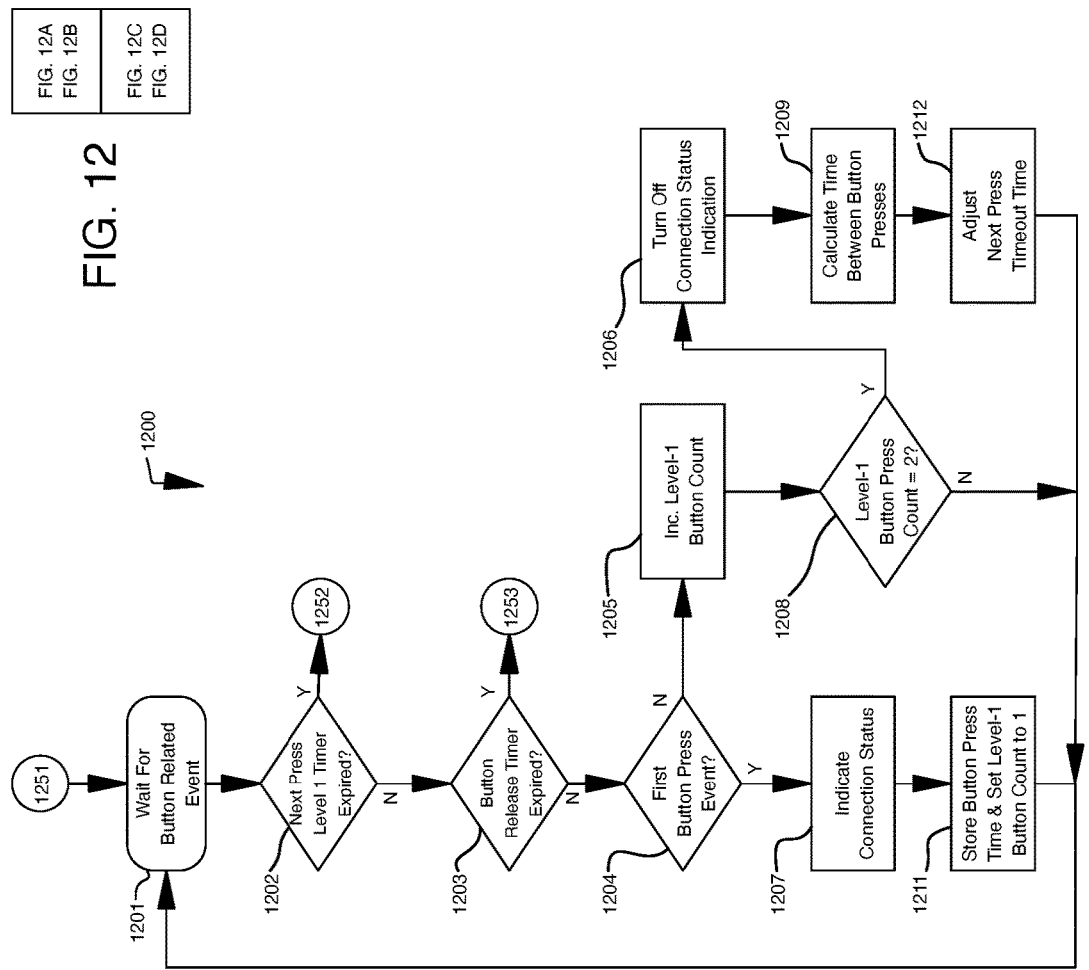
FIG. 12A is a flow diagram of an exemplary method of using a single user interface button on an exemplary PRD for a multitude of functions and adjusting the user interface based on the speed of the user operating the user interface.

An exemplary PRD method to determine categories of functions to be performed because of the user interface 207, FIG. 2, input button 101, FIG. 1B, being pressed and released, or pressed and held for some period, and to determine the speed of the user 105, FIG. 1A, button 101, FIG. 1B, actuations and adjust the interface 207, FIG. 2, while momentarily displaying the status of the PRD 100, is depicted by FIG. 12A.

The method 1200 is executed by entry into 1201 via the method of event dispatch 1120, FIG. 11, the button 101, FIG. 1B, events having been registered to the event dispatch during PRD 100 initialization.

In this implementation the category of what is performed is determined by counting the number of button 101, FIG. 1B, presses or length of time the button 101, FIG. 1B, is depressed. Some implementations may use the length of button presses or sequences (or pattern) of short and long button presses or additional user interface 207, FIG. 2, input mechanisms such as sensors or additional buttons, or a touch surface area capable of scrolling user input, or gesture recognition to determine what category of function is to be performed.

A reader knowledgeable in the art of programming and/or programming embedded systems will appreciate for clarity overhead items such as initialization of a timer having been done are implicit when the timer expires, for example 1202, "Next Press Timer Expired?"

On the first press (and/or release) of the button 101, FIG. 1B, neither the next button press timer 1202 or button release timer 1203 has expired and being the first button 101, FIG. 1B, press 1204 the indication of the connection status 1207 is performed. In some implementations the red led 207E, FIG. 3, may be illuminated to indicate the PRD 100 is not connected to the protected phone 104, FIG. 1A, the blue led 207D, FIG. 3, illuminated to indicate the PRD 100 is connected, and the absence of any illumination to indicate the PRD 100 is off. Execution continues from 1207 immediately and button press count is initialized and the time of button 101, FIG. 1B, press saved 1211 in RAM application area 614, FIG. 6C. Execution proceeds to 1201 to await another button 101 press event.

On the second button 101 press, neither the next button press timer 1202 or button release timer 1203 has expired, and execution branches away from the loop as determined by 1204 this is not the first button 101 press. The button 101, FIG. 1B, press count is incremented 1205, and if the button 101, FIG. 1B, count is equal to 2 1208, the connection status indication is turned (LEDs off) 1206 and the time between button presses calculated 1209 and the next button press timer adjusted 1212 to address the speed at which the user 105 can actuate the button 101, FIG. 1B. The process returns to wait for another button related event 1201 which could be a button related timer timeout event or additional button 101, FIG. 1B press. If the next event were a no further button 101, FIG. 1B, actuation timeout event as determined by 1202, execution would continue to 1282, FIG. 12D.

The flow diagrams and drawings illustrate exemplary methods of using a single user interface button for a multitude of functions including configuration, performing ancillary functions (or actions) such as remote shutter for the protected phone 104, FIG. 1, camera application, power-off, entering a nap mode, and adjusting the user interface 207, FIG. 2, based on the speed of the user 105, FIG. 1A, operating the button 101, FIG. 1B.

Figures 12C, 12D:
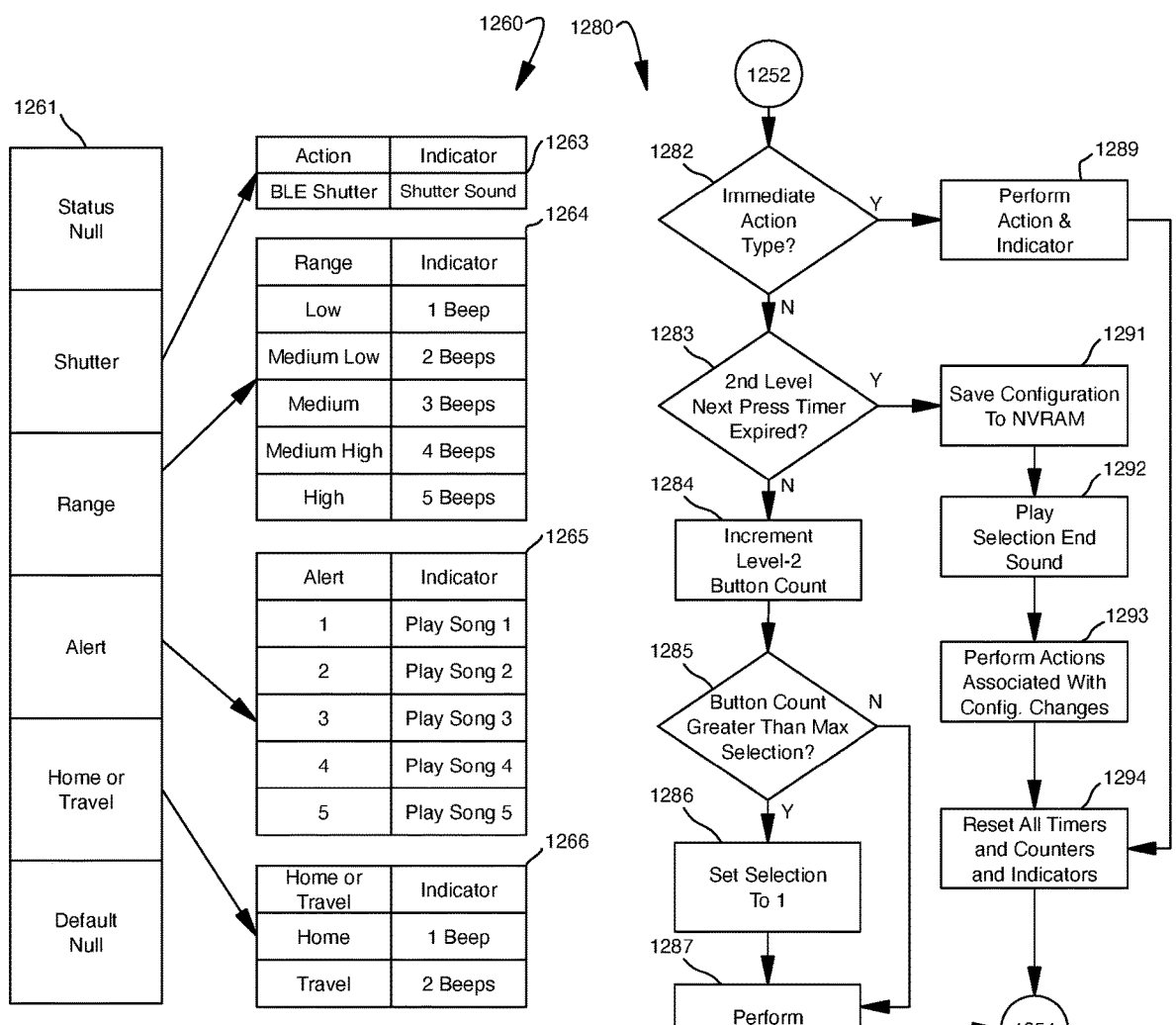
FIG. 12C is a block diagram illustrating additional detail of the organization of configuration and functions modifiable or activatable respectively, by the user interface of an exemplary PRD.
FIG. 12D is a flow diagram of an exemplary method of utilizing a single button user interface of an exemplary PRD to perform an action or to select and modify a configuration.

For example, with the button count of 2, should the timer expire 1202, the method 1280 (FIG. 12D) would be initiated and a remote shutter activation 1263, FIG. 12D, message sent from the PRD 100 to the protected phone 104 camera application to actuate the shutter.

An exemplary PRD method of selecting to either power off the PRD 100 or select a value for the time to nap, like a power off for some period is depicted by FIG. 12B. If the user pressed and held the button 101, FIG. 1B on the PRD 100 for some time, eventually the button release timer would expire 1203, FIG. 12A, and the "nap or power off" category selected and entry into method 1220 via 1221 processing would begin. In some implementations, the time to release the button 101, FIG. 1B, selecting the "nap or power off" category equals the power-on time of 3 seconds but could be any of an infinite number of time values such as 2.9, 3.1, 2.9995 seconds. In some implementations, turning off the BLE (radio) may cause a message being sent to the protected phone 104, FIG. 1A, by the PRD 100 indicating an imminent BLE disconnect due to power off.

In some implementations, as the button 101, FIG. 1B, is held down (depressed) the audio 103, FIG. 1B, may produce a single beep 1222 to indicate the first nap time duration is activated. As the button 101, FIG. 1B, is still depressed for some time period 1223 and not released 1224, a comparison is made to determine if the maximum nap time duration has been exceeded 1225, and if not, the nap time duration is incremented 1226, until either a button 101, FIG. 1B, release or the maximum nap time is exceeded.

If the button 101, FIG. 1B, is not released and the maximum nap time 1225 exceeded, power off 1130 is initiated. In some PRD 100 implementations the initiation of power off may come with indications such as turning on the red LED 207E, FIG. 3), or playing a sound unique to the power off via the audio 103, FIG. 1B.

If the button 101, FIG. 1B, is released before the maximum nap time 1224, the nap timer is started, and indication of nap indicated 1228. In some PRD 100 implementations the initiation of nap may come with indications such as turning on the red LED 207E, FIG. 3, or playing a sound unique to the nap via the audio 103, FIG. 1B. The nap duration selected is used to initialize the nap timer for some amount of time. In some implementations the selected nap times might be 15, 30, 60 and 120 minutes. In other implementations selected nap might be 15, 60, 120 and 240 minutes.

An exemplary PRD method 1260 of organizing configuration settings modifiable by the single button 101, FIG. 1B, actuation by method 1200, FIG. 12A, and 1280, FIG. 12B, or actions to be performed is depicted in FIG. 12C. In some implementations the configuration and actions 1261 consist of a) initiating a status indication action, b) initiating a shutter action 1263, c) setting the range configuration 1264, d) setting the alert sound configuration 1265, or e) setting the home or travel mode configuration 1266. In another implementations no actions or configurations may be available. In some implementations there might be 10 range settings. In some implementations there might be additional configurable items or actions including, without limitation, setting alerts to continuous until button 101 press, consumer controls for controlling music volume up/down, play, pause, or rewind. In some implementations there may be an action to ping the phone and cause it to perform a type of auditory alert to assist the user 105, FIG. 1A, to locate the protected phone 104, FIG. 1A.

An exemplary PRD method 1280 of a user 105, FIG. 1A, setting a configuration option within the PRD 100 or initiating an action of the PRD 100 is depicted by FIG. 12D. In some implementations and as an example, to change the alert sound associated with a lack of proximity between the PRD 100 and protected phone 104, FIG. 1A, the user 105, FIG. 1A, would have pressed the button 101, FIG. 1B, 3 times as processed through method 1200, FIG. 12A. On entry into method 1280, a determination is made if the button count ($1^{st}$ level) of 3 times is an action or configuration 1282 by accessing associated data 1261.

A reader might appreciate the association between button presses and actions to perform or configuration items to change may be assigned in any order. In this exemplary implementation a button press count association is: 1) a status action; 2) a shutter action; 3) a range configuration; 4) an alert configuration; or 5) a home or travel configuration. A reader might further appreciate method 1200, FIG. 1A, and 1280 allow for pressing the button 6, 7, 8, or 1000 times, and performs a null function and is useful if you have children who cannot resist the appeal of the PRD 100.

Continuing the 3 button 101, FIG. 1B, press example, execution continues from 1282 to 1283 and the $2^{nd}$ level timer is not expired, the $2^{nd}$ level button 101, FIG. 1B, count 1284 is incremented. As the $2^{nd}$ level button 101 (FIG. 1B) count does not exceed the possible configuration options 1285, the current range indication is executed 1287. In some implementations indication of selected configuration may cause audible feedback via the audible alert 103, FIG. 1B, of 3 beeps to indicate the middle range of 5 ranges has been selected. If no further action is taken (button presses) by the user 105, FIG. 1A, a timeout event will occur 1283 and the selection saved to non-volatile memory 203, FIG. 6B. In some implementations a selection concluded unique audible indication 1292 may be generated via the audible alert 103, FIG. 1B. As the range configuration has been selected, in this example medium range, the action associated 1293 with changing the range is initiated by programmatically adjusting the power amplifier 403, FIG. 4, amplification level to the medium range, which may be −4 dBm in this implementation.

As the configuration is completed all timers and counters are reinitialized 1294 and processing returns to the beginning of method 1200, FIG. 12A. A reader familiar with the art of programming will appreciate in some implementations block 1286 allows for the selection to "wrap" from the maximum selection to the minimum selection such the selection via button presses can continually cycle through configuration options repeatedly.

If in the previous example, the button 101 (FIG. 1B) level-1 count were equal to 2, the shutter action would have been selected. As the shutter selection is determined to be an action 1282, the action is performed immediately 1289 and a remote shutter activation 1263 (FIG. 12D) message sent from the PRD 100 to the protected phone 104 camera application to actuate the shutter and then all timers and counters would be reinitialized and method 1280 would return to method 1200 (FIG. 12A).

Figure 13A:
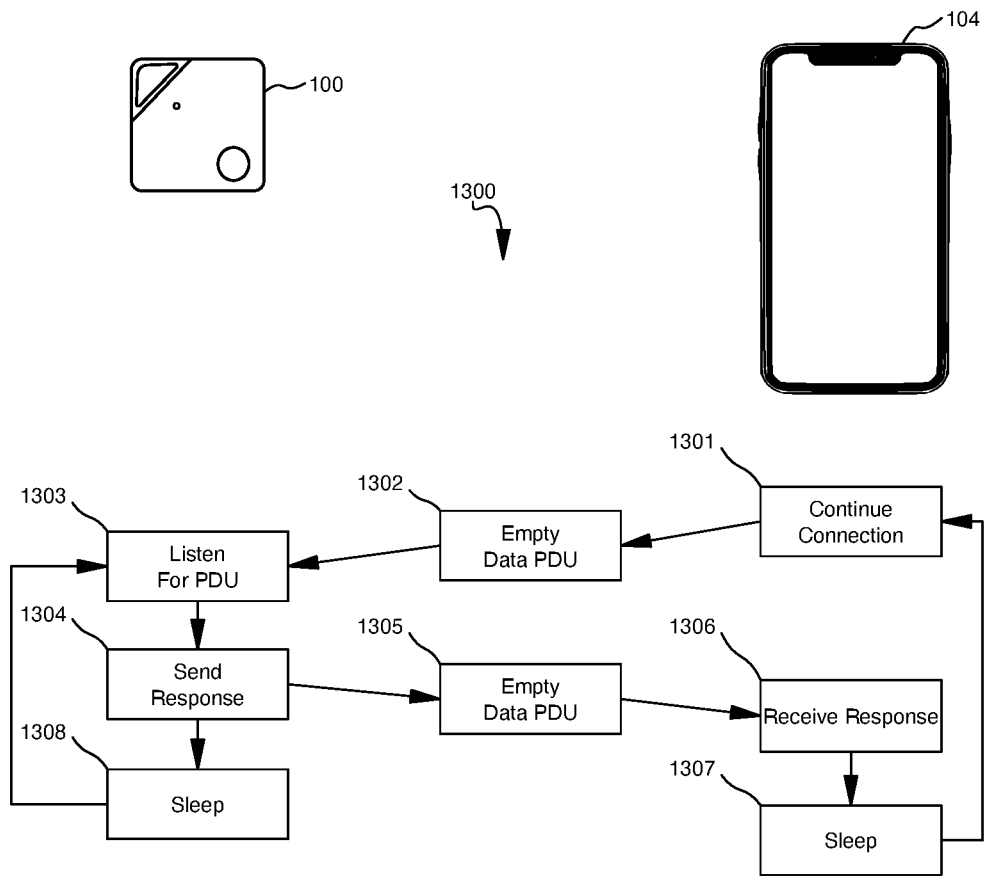
FIG. 13A is a swim-lane diagram illustrating an exemplary method of confirming a connection between a PRD and a phone.

An exemplary PRD method 1300 for confirming a state of connection exists between the PRD 100 and protected phone 104, FIG. 1A, as established through the exemplary method 700, FIG. 7, is depicted by FIG. 13A. The protected phone 104, FIG. 1A, continuing the connection 1301 periodically sends an empty data PDU 1302 to the PRD 100 listening for such BLE message 1303. The PRD 100, having received the message, responds 1304 by sending an empty data PDU response message 1305 received 1306 by the protected phone 104 which then sleeps 1307 until the next period in which to send again. The PRD 100 having sent the response 1304 also sleeps 1308 until the next time to listen.

A reader knowledgeable in the art of Bluetooth Low Energy ("BLE") might appreciate the method 1300 is not exchanging data at the Open Systems Interconnection ("OSI") application layer by design for a preferred exemplary implementation, but instead merely keeping the connection alive at the OSI (and BLE) link layer. A reader might further appreciate this minimizes the power consumption by minimizing the time the radio 206 (FIG. 2) is transmitting and receiving.

In some implementations, the PRD 100 can periodically continue the connection with the phone 104, without consuming substantial power, by not turning on the radio 206, FIG. 2, at every 1303 period (interval) in which the phone 104 transmits an empty PDU 1302 ("keep alive") BLE message. In some implementations the PRD 100 may skip the first iteration of listening, thereby listening to every $2^{nd}$ packet. In some implementations the PRD 100 may listen to every $3^{rd}$ packet. In some implementations the interval between iterations (BLE connection interval), the sleep time 1307 and 1308, can be selectively set to 10 milliseconds ("mS"), or 7.5 mS.

Figure 13B:
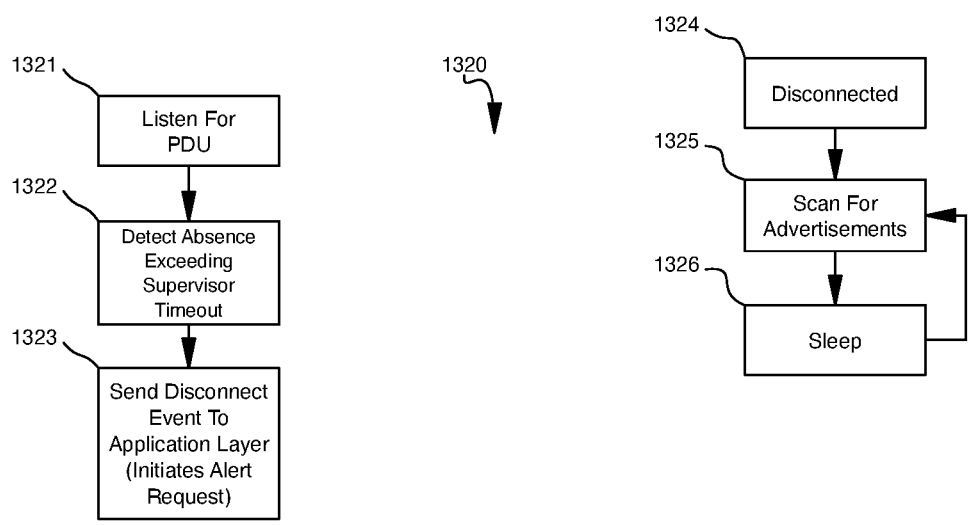
FIG. 13B is a swim-lane diagram illustrating an exemplary method of confirming a disconnection between a PRD and phone and initiating an alarm request.

An exemplary PRD method 1320 of indicating with an alarm a connection between the PRD 100 and protected phone 104 is no longer present, which may result from a phone 104 battery exhaustion or physical separation beyond the range of the radio 206, FIG. 2, range is depicted in FIG. 13B.

In this exemplary method 1320, if the empty PDU 1302, FIG. 13A, keeping the connection continuing and normally sent by the phone 104 is not sent, or sent but not received 1321 by the PRD 100, or the response 1305, FIG. 13A, from the PRD 100 not received by the phone 104, after 11 such iterations and after the supervisory timeout duration of 3 seconds, the phone will be in a state of disconnected 1324 and periodically listen for advertisements 710, FIG. 7, from the PRD 100 to reestablish a connection and sleeping 1326 otherwise. The PRD 100, likewise will listen 1321 for multiple iterations and then start the supervisory timeout period of 3 seconds. If no PDU is received 1321 by the PRD 100, it will have detected the absence for the entire timeout period 1322 and inform 1323 the application layer of the PRD 100 of the condition.

A reader might appreciate the sequence follows the standard specification of the Bluetooth Low Energy link layer. Some PRD 100 implementations may receive only via radio frequency transmission from a protected device which does not monitor and create a connection state or utilizes a radio frequency communication other than BLE. Such packets (transmissions) may be empty or with data or may contain metadata to allow for the distance between the PRD 100 and a protected device to be directly measured or inferred. A "connection" such as with BLE is not a requisite for other implementations of the PRD 100 method 1320. A reader might further appreciate since this preferred implementation is utilizing BLE and the link layer thereof, the functionality is dictated by the BLE standard, and the link layer can only generate a disconnect event and not initiate a lack of proximity alarm directly.

Figure 16A:
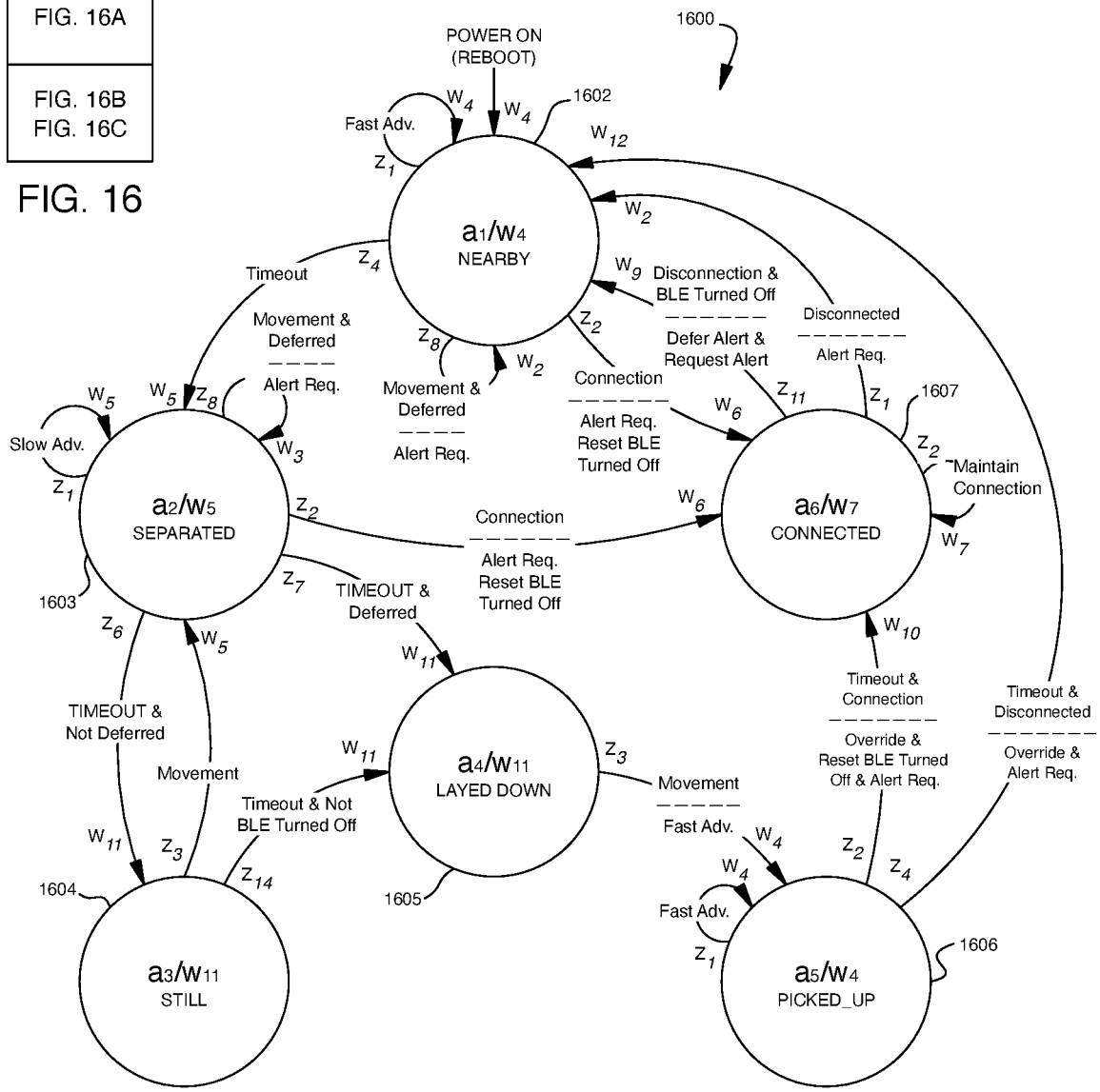
FIG. 16A is a state machine diagram illustrating an exemplary PRD method of power management, proximity management, alert management, and reminders.

Once the PRD 100 has initiated a disconnect event 1323 via method 1320, the exemplary method 1600, FIG. 16A, determines if an alarm is warranted based on a variety of factors including selected mode of operation (home or travel), persistence of inferred or measured lack of proximity, movement, and time without movement. If via the method 1600, FIG. 16A, an alarm is warranted, an alarm is requested but potentially mitigated based on method 1400. Dependent on circumstances a disconnect event in method 1320 may not generate a request for alarm in method 1600, and if a request for alarm is generated in method 1600, the request may be denied (mitigated) in method 1400, FIGS. 14A and 14B, and no alarm generated.

Figure 14A:
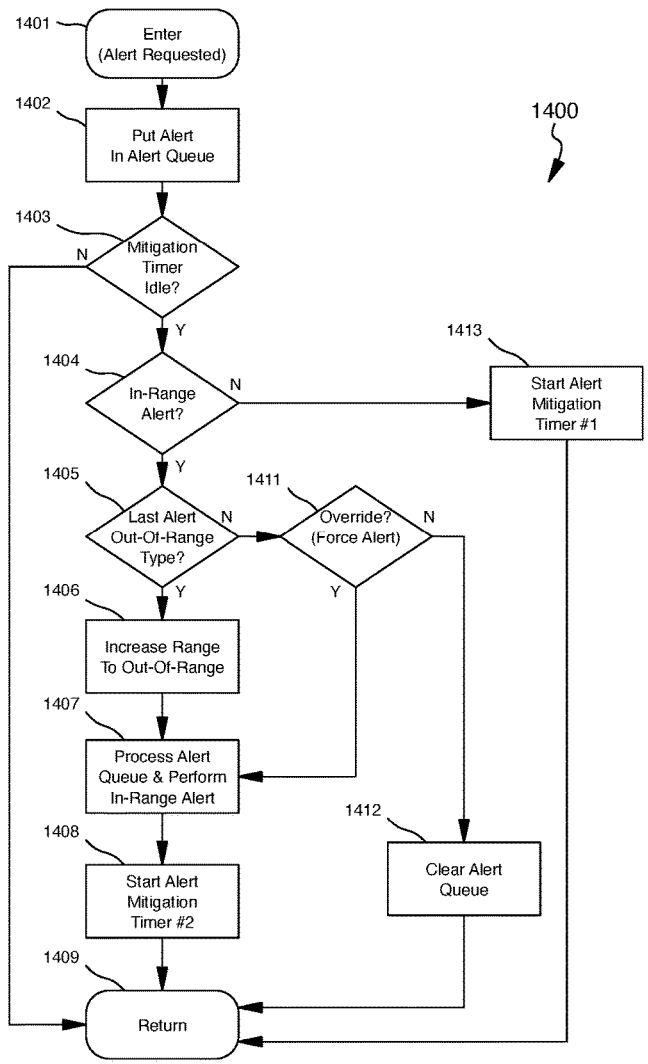
FIG. 14A is a flow diagram of an exemplary PRD method of initiating an alarm request.

An exemplary PRD method 1400 of alarm mitigation is depicted in FIG. 14A. FIG. 14A is a flow of an exemplary PRD method of initiating an alarm request with mitigation as part of method 1400. An exemplary PRD method of further processing an initiated alarm as part of method 1400, and either performing or mitigating the alarm, is depicted in FIG. 14B.

Referring to FIG. 14A, once an alert is requested from method 1600, FIG. 16, and received by method 1400 at 1401, the request for alert is queued 1402, and a determination 1403 is made if the mitigation timer is idle. If idle, a determination is made if the alert (alarm) requested is associated with an in-range (in physical proximity) or out-of-range (not in physical proximity—separated) event 1404 such as would be appropriate for an alarm due to a physical separation between the PRD 100 and protected phone 104. If an out-of-range event occurs, the alert mitigation timer #1 is started 1413 and the method 1400 exited by returning 1409 to the alert requestor. In the above, instead the alert requested was an in-range 1404, and the last alert an out-of-range type 1405, and no conflicting alerts are in the queue, the range would be adjusted to perform hysteresis 1406, the in-range alert would be performed 1407, mitigation timer #2 started 1408 and the method 1400 exited by returning 1409 to the alert requestor. If instead, the alert mitigation timers were not idle 1403, the alert request would have been queued 1402 and the method 1400 exited immediately by returning 1409 to the alert requestor. It is always possible the alert requester has a special condition and requests an alert identical to a previously requested alert, for example two out-of-range (separation) alerts. This situation is accommodated 1411 by a force alert condition of the alert request.

Figure 14B:
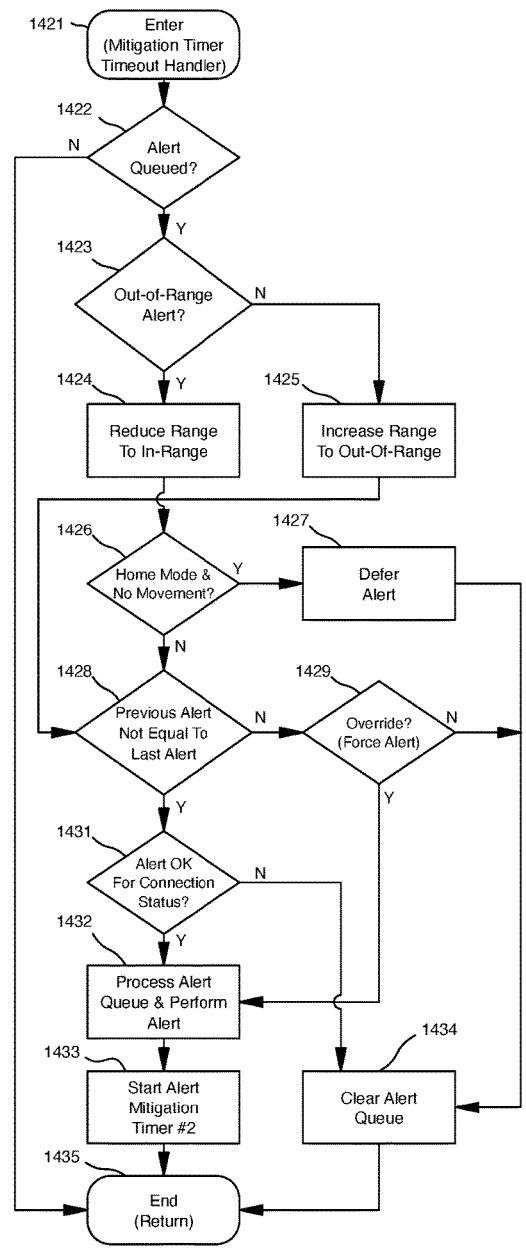
FIG. 14B is a flow diagram of an exemplary PRD method of further processing of an initiated alarm.

Referring to FIG. 14B, once the alert mitigation timer has expired 1421, and an alert present in the alert queue 1422, a hysteresis may be initiating by adjusting the alert range to in-range, (not-separated range) 1424 or adjusting the alert range to out of range (separated range) 1425. In some implementations, for example using UWB, when an out-of-range (separated) alert is desired, the alert range may be reduced (1424) from 30 feet to 5 feet. If an in-range (not-separated) alert is desired, the alert range may be increased 1425 from 5 feet to 30 feet. Any method of measuring distance or inferring proximity may require hysteresis as accommodated in method 1400. In the preferred implementation, the radio amplifier 403 (FIG. 4) is programmatically controlled and the radio signal amplification decreased or increased dependent on the range required. After the hysteresis has been performed, and the PRD 100 is in travel mode or home mode and movement has been detected during method 1400 processing 1426, the same protection against redundant alarms in FIG. 14A 1405 & 1408, is present in 1428 and 1429. If the PRD 100 is still in the state appropriate to the alarm 1431, the alert is performed 1432, the alert mitigation timer #2 started 1433 and method 1400 exited by returning 1435 to the event dispatch method 1120, FIG. 11A.

If in the above, the PRD 100 was not in travel mode and had not undergone movement during the method 1400 processing, the alert is deferred 1427 for further consideration by method 1600, the alert queue cleared 1434 and method 1400 exited by returning 1435 to the event dispatch method 1120, FIG. 11A. In a preferred implementation of the PRD 100, when the alert is performed, an audible alert of the configured alert sound 1265, FIG. 12C, is generated via the audible alert 103, FIG. 1B.

The purpose of the mitigation timer #1 in method 1400 is to introduce an additional time in which the PRD 100 might attempt to reestablish communication before alarm of a lack-of-proximity (physical separation exists). In the preferred implementation of the PRD 100, during this period the PRD 100 may restart BLE advertisement, and if proximity is reestablished the alarm mitigated in method 1400, per 1431.

A reader knowledgeable in BLE might appreciate by initiating an alarm via method 1400 and then restarting advertisement 710, FIG. 7, after attempts to continue a connection between the PRD 100 and protected phone 104 have timed out 1322, FIG. 13B, a stable connection might be reestablished between the PRD 100 and protected phone 104. This may be due to the reconnect causing other BLE channels to be utilized, which are free of radio frequency interference, instead of the previous channels utilized due to the BLE channel map might have had radio frequency interference. Or it is the total of radio frequencies used will be increased to include additional radio frequencies free of radio interference avoiding radio interference.

The purpose of timer #2 provides a secondary hysteresis in which there is a period in which no further alerts will be generated to prevent an oscillation or back-and-forth alert cycle when the primary hysteresis is not sufficient. For example, if the user 105 (FIG. 1A) were to have the PRD 100 in their pocket while looking for something and turn in manner their body was between the PRD 100 and protected phone 104, then turn back, and the cycle repeated, the user might experience separated and not-separated alerts without the secondary hysteresis as the primary hysteresis 1424 and 1425, FIG. 14B, was exceeded.

At the expiration of timer #2, a timeout event is generated and distributed to 421, there are no more alerts in the queue 1422, and method 1400 exited by returning 1435 to the event dispatch method 1120, FIG. 11A. The mitigation is idle 1403, FIG. 14A, if further alert requests occur.

Figure 15:
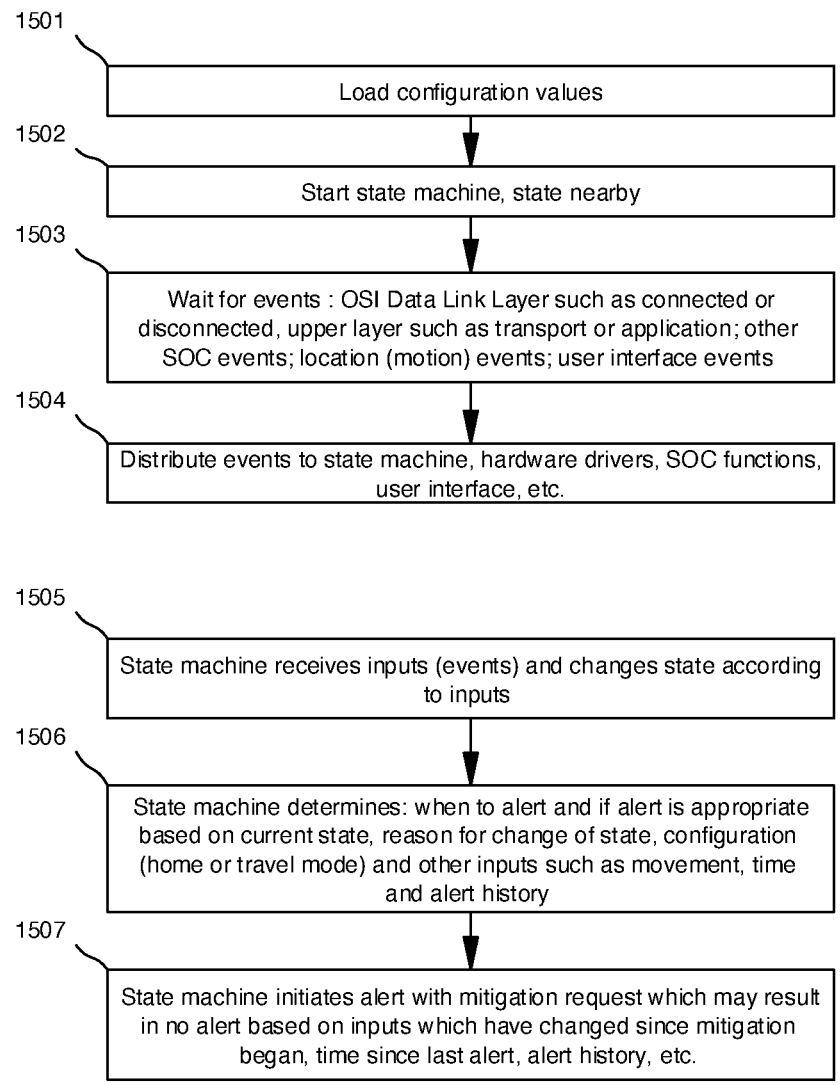
FIG. 15 is a block diagram illustrating a simplified overview of the major software tasks and functions of an exemplary PRD.

FIG. 15 depicts a simplified overview of the major tasks of an exemplary PRD 100. When the PRD 100 is started via power-on (turn on) or reset, configuration values are restored from non-volatile memory 1501, the state machine 1502 method 1600, FIG. 16A, is initialized and started, and the method 1120 entered for dispatch of events 1504. Until an event occurs, for example a button 101, FIG. 1B, or a radio 206, FIG. 2, event, the state machine method 1600, FIG. 16A, is idle awaiting events. When an event occurs 1505, the event is presented to the state machine, method 1600. The state machine method 1600, FIG. 16A, may determine actions to be performed including requesting an alert from method 1400. This cycle continues until a nap or power off.

An exemplary PRD method of power management, proximity management, alert management, and alert reminders is depicted in FIG. 16A. The inputs ($Z_f$) to the state machine are defined in FIG. 16B and the outputs (Wg) defined in FIG. 16C. The diagram presented is a "Mealy" type in which outputs depend on the current state and current input: $a_s = \delta(a_m, Z_f)$, $W_g = \lambda(a_m, Z_f)$.

When the PRD 100 and protected phone 104 are not in proximity and are physically separated beyond the $D_{Alarm}$ (FIG. 10) distance in a preferred PRD implementation using BLE, entry from power on or reset 801, FIG. 8, is via either 700 or 807, FIG. 8, to the "nearby" state 1602. During this state intensive ("fast") but power consuming BLE advertisement is performed for a brief period until timeout input $Z_4$, FIG. 16B, at which point a transition to "separated" state 1603 occurs with output $W_5$, FIG. 16C, slow advertising.

While in state 1603, "slow" advertising $W_5$, which is less power intensive than "fast" advertising, continues for a period longer than the fleeting time used for "fast" advertising. When the time is expired $Z_6$ (FIG. 16B), a transition to the "still" state 1604 is performed. While in the "still" state 1604, no "slow" or "fast" advertising is occurring $W_{11}$, (FIG. 16C) and only the movement of the PRD 100 $Z_3$ (FIG. 16B) or a timeout $Z_{14}$ (FIG. 16B) will cause a state transition.

A reader may appreciate in this state, the PRD 100 is not attempting to determine proximity to the protected phone 104 and only consuming a minimum of power by utilizing method 1120, FIG. 11A, to wait for an event such as movement while the SOC 301, FIG. 5, is in a sleep 1102, FIG. 11A, mode. The power management as implemented by method 1600, FIGS. 16A-16C, considers likely PRD 100 usage scenarios by the user 105, FIG. 1A, and on movement does not return to a state with high power consumption. For example, a user taking their keys with attached PRD 100 on a jog without their protected phone 104 left at home. The PRD 100 would cycle between the "still" state 1604 and "separated" state 1603 but avoid the most power intensive "nearby" state 1602. On returning home, the user 105, FIG. 1A, with the PRD 100, may become in proximity to the protected phone 104 by being within distance $D_{CONNECT}$, FIG. 1F, and in the "nearby" state 1602, and a transition occur to a "connected" state 1607 and the protected phone 104.

Returning to the description without the example of a jog, the PRD 100 has continued to not move for some period while in the "still" state 1604. When the time has expired $Z_{14}$, FIG. 16B, a transition to the "laid down" state 1605 occurs with output $W_{11}$, FIG. 16C. As in the "still" state 1604, the PRD 100 is not attempting connection via advertisement to the protected phone and only consuming a minimum of power by utilizing method 1120, FIG. 11A, to wait for an event such as movement while the SOC 301, FIG. 5, is in a sleep mode 1102, FIG. 11A.

A reader at this point might not appreciate what differentiates the "still" state 1604 from the "laid down" state 1605 when the outputs are the same, FIG. 16A. The "laid down" state 1605, unlike the "still" state 1604, may only transition to the "picked up" state 1606. This method 1600, FIG. 16A, effectively arms a reminder alert when future movement of the PRD 100 occurs.

When in the "laid down" state 1605, FIG. 16A, and movement $Z_{14}$, FIG. 16B, occur, a transition to the "picked up" state 1606 occurs and fast advertising $W_4$, FIG. 16C, started. If a brief period expires and no connection between the PRD 100 and protected phone 104 reestablished $Z_4$, FIG. 16B, a transition to the "nearby" state 1602 occurs and an alert is requested with override $W_{12}$ (output) from method 1400 by calling 1401, FIG. 14A. In a preferred implementation of the PRD 100 the sensitivity to movement while in the "still" state 1604 would be greater than when in a "laid down" state 1605 to detect the PRD 100 is still physically with the user 105, FIG. 1A, while in the "still" state 1604 and protecting against minor disturbance (not picked up) while in the "laid down" state 1605.

The significance of requesting an alert with override from method 1400, FIGS. 14A and 14B, is considered. An override allows for alerts of the same type (separated or not separated) to be duplicated, e.g., reminder alerts. For example, a user 105, FIG. 1A, awakening in the morning and following normal routine might get dressed, put their keys with the PRD 100 attached in their pocket, realize the phone needs additional charge, and put it on the charger and then head out of the bedroom to the kitchen for breakfast. The PRD 100 not being in physical proximity to the protected phone 104 exceeding distance $D_{Alarm}$ and moving, FIG. 1E, will generate a separated alert. The user 105, FIG. 1B, knowing he/she purposely separated from the protected phone 104 when the alert is received proceeds to breakfast. After breakfast, and having broken from the normal routine, the user 105, FIG. 1A, stands up from the breakfast table and having forgotten their phone 104 is still charging and leaves for work. Having been sitting long enough for the PRD 100 to transition to the "laid down" state 1605, FIG. 16A, then moved, a transition to the "picked up" state 1606 occurs. As the PRD 100 and the protected phone 104 are still physically separated, the user 105 receives a second separated alert (reminder) and retrieves the forgotten phone from the bedroom. Once the user 105, FIG. 1A, and associated PRD 100 are in physical proximity far away within $D_{CONNECT}$ (FIG. 1H) with movement $Z_4$ (FIG. 16B), the PRD 100 transitions to the "connected" state 1607 and generates an in-range (in proximity) alert $W_{10}$, FIG. 16C.

To further understand PRD exemplary method 1600, consider an example scenario of the PRD 100 and protected phone 104 in physical proximity on a nightstand at night with the PRD 100 in the "connected" state 1607. As phones become more like computers, the frequency of software updates has likewise increased. If the protected phone 104 begins an update process, the phone is disabled or rebooted for update installation without full functionality until the update installed. Depending on the make and model of the phone, a BLE message from the protected phone 104 is sent to the PRD 100 informing it the phone BLE will be imminently disabled. This also occurs when a phone is put into "airplane mode." If the PRD 100 receives such a message and subsequent disconnection when the protected phone BLE is disabled $Z_{11}$ (input condition FIG. 16B). The PRD 100 will set the defer alert condition, request alert, and initiate "fast" advertising per the output $W_9$, FIG. 16C, and transition to the "nearby" state 1602. The situation of both deferring the alert and requesting an alert is to account for the potential of the user 105, FIG. 1A, moving the PRD 100 during the transition.

The PRD 100 alert is now being deferred and the state of the protected phone 104 still without BLE functionality, any subsequent movement of the PRD 100 $Z_8$, FIG. 16B, will cause an alert request $W_2$, FIG. 16C, via method 1400, FIG. 14A, resulting in an alert. If after a period without movement the PRD 100 transitions to the "separated" state, movement ($Z_8$) (FIG. 16B) will also cause an alert request $W_3$ (FIG. 16C) via method 1400 resulting in an alert.

The reader might appreciate the consequence of the PRD 100 having generated an alert after the BLE was turned off is future reminder alerts are disabled as the transition from the "still" state 1604 to the "laid down" state 1605 cannot occur. The reminder alerts on movement are not armed. This is by design such if the user 105, FIG. 1A, were to be on an airplane and put the protected phone 104 into airplane mode disabling the BLE, the PRD 100 would not generate reminder alerts throughout the flight.

Figure 17:
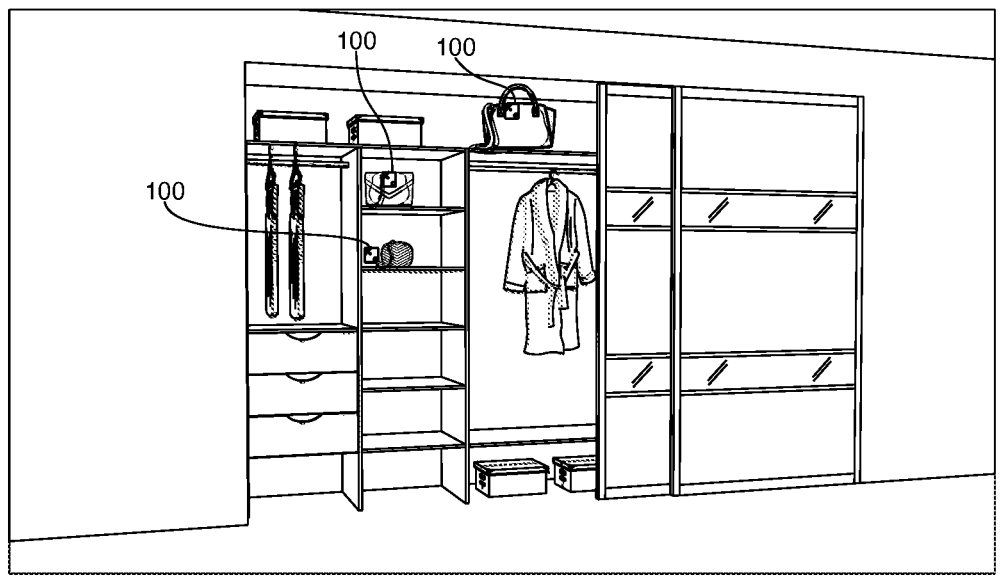
FIG. 17 illustrates a closet with three (3) exemplary PRDs on separate purses, each PRD in a power saving sleep state awaiting movement.

A reader might further appreciate that protected phones 104 which cannot generate a notice of imminent BLE disablement during a middle of the night update, will not cause the PRD 100 to alert during the night if the PRD 100 is in "home" mode, for when the alert is requested via method 1400, the decision "Home Mode & No Movement" 1426 will cause the alert to be deferred 1427 and no alert generated until subsequent movement. However, future reminder alerts are not disabled and still will occur per the $Z_7$, FIG. 16B, input to the "separated" state 1603 with output $W_{11}$, FIG. 16C, transition to the "laid down" state 1605 which rearms the reminder alerts. FIG. 17 depicts a closet with three (3) exemplary PRDs 100 on separate purses, each in a power saving sleep state awaiting movement. Having just described the method 1600 a reader might appreciate and already have determined the PRDs 100 are in a "laid down" 1605, FIG. 16A, state and have been for some considerable period. Should the user 105, FIG. 1A, pick up a purse with attached PRD 100, within a moment the PRD 100 will generate an alert indicating 1) the protected phone 104 is in proximity to the PRD 100 and an in-range (not-separated) alert generated per output $W_{10}$, FIG. 16C, in the transition to the "connected" state 1607, FIG. 16A, or 2) the protected phone 104 is not in proximity to the PRD 100 and an out-of-range (separated) alert generated per output $W_{12}$, FIG. 16C, in the transition to the "nearby" state 1602, FIG. 16A. In either case, the user 105 has immediate feedback (confirmation) the PRD 100 is active and functioning.

The last example the reader might appreciate is one of with a purse with attached PRD 100 left near the front door every evening, the protected phone 104 being charged every night a considerable distance away exceed the $D_{ALARM}$, FIG. 1C, distance, and the PRD 100 having alert of such. In the morning, the user 105 picks up the purse with the PRD 100 in a "laid down" power saving state 1605, FIG. 16A, and will either receive an alert from the PRD 100 indicating the protected phone 104 is in physical proximity or an alert indicating the protected phone 104 is not in proximity and physically separated from the PRD 100. Regardless of the alert received, the user interface now provides confidence the PRD 100 is functioning and, if an in-range alert is received, ready to proceed with their important possessions including their protected phone 104.

The disclosed phone reminder apparatus, systems, and methods include program instructions 608, FIG. 6B, encompassed within non-volatile memory 203, FIG. 6B, to provide, upon pairing and bonding, 725, FIG. 7, encompassed by 700, FIG. 8, with the protected device 104, FIG. 1A, loading configuration values from memory 202, FIG. 2, based upon an apparatus or system for a proximity alert processor implemented method comprising: during runtime execution of the proximity alert apparatus running an application continuing a connection using method 1300, FIG. 13A, ¶0137-¶0141, detecting loss of connection method 1300, FIG. 13B, ¶0137-¶0141, and distributing event FIG. 15 which dispatches button events to method 1200, FIGS. 12A and 12B, alert request events to method 1400 which performs mitigation and further actions such as proximity alert 103, FIG. 1B, via method 1600, FIG. 16, ¶0143-¶0151 operational states which depend further on configuration values 1260, FIG. 12C, of user inputs, method 1200, FIG. 12A, in response to one or more proximity alert apparatus or system operational states relating to proximity, FIGS. 16A and 16C, time and motion alert inputs, FIGS. 16B and 14A, and outputs, FIGS. 14B and 16C; for individual captured sequences 614, FIG. 6C, determining the proximity alert apparatus or system integral power savings for each captured sequence, FIG. 16C, and 1411, 1423, 1426-1429, FIGS. 14A and 14B, regarding one or more operational states FIGS. 16A and 16C; applying an automated response to the captured sequence based on an optimum system for proximity alert integral power savings outcome method 1600, FIGS. 16A-16C; storing the captured sequence and the optimum proximity alert integral power savings outcome [paragraph 0153, infra] in a runtime memory 614, FIG. 6C, within the apparatus or system for proximity alert processor; identifying one or more captured sequences based on the apparatus or system for proximity alert processor controlled integral power savings real time status associated with the optimum proximity alert integral power savings outcome event confronting the apparatus or system for proximity alert processor controlled operational state; selecting a captured sequence from the one or more captured sequences, and the control method associated with each individual sequence; and executing the selected captured sequence for the controlled operational state, FIG. 16A, integral power savings method in response to the operational state confronting the proximity alert apparatus or system.

We claim:

1. A proximity alert apparatus comprising: a processor comprising non-volatile and volatile memory; a user input device; means for auditory output and visual output to a user; an accelerometer; a replaceable, integral power source; at least one radio transceiver comprising a frequency synthesizer; and primary memory that stores program instructions to be executed by the processor, the program instructions comprising instructions that, when executed:

A) load a configuration value from the non-volatile memory and set a transmission power level for the at least one radio transceiver, based on a loaded first configuration value, to a configuration power level from among a plurality of known power levels;

B) provide a persistent and continuous radio frequency communication relationship utilizing Bluetooth Low Energy ("BLE") pairing and bonding between the proximity alert apparatus and a protected device comprising a corresponding radio transceiver;

C) provide visual output and auditory output confirmation of successful pairing to the protected device;

D) receive notice of disconnect of link connectivity between the proximity alert apparatus or system and the protected device from an Open Systems Interconnection (OSI) Bluetooth Low Energy (BLE) link layer;

E) perform a state machine cycle depending upon input and output for at least six proximity alert apparatus operational states comprising:
   i) the proximity alert apparatus is near the protected device,
   ii) the proximity alert apparatus is separated from the protected device,
   iii) the proximity alert apparatus is connected to the protected device,
   iv) the proximity alert apparatus is still,
   v) the proximity alert apparatus is laid down, and
   vi) the proximity alert apparatus is picked up;

F) adjust the proximity alert apparatus transmission power level a predetermined increment up or down from the plurality of known standard power levels based upon the proximity alert apparatus operational state;

G) adjust the transmission power level of the proximity alert apparatus at least one radio transceiver up or down by the predetermined increment;

H) save the proximity alert apparatus adjusted transmission power level to either the non-volatile memory or volatile memory dependent on operational state;

I) trigger a selectable auditory proximity alert apparatus alarm output in response to the protected device being more than a selected distance from the proximity alert apparatus;

J) trigger an auditory proximity alert apparatus alarm output in response to the protected device being less than a selected distance from the proximity alert apparatus;

K) trigger a selectable auditory proximity alert apparatus alarm output in response to a protracted period without link connectivity and historical lack of movement, and then movement; and L) during runtime execution of the proximity alert apparatus running an application comprising configuration values during operational states of user inputs in response to one or more proximity alert apparatus operational states relating to proximity, time, and motion alert inputs and outputs; for individual captured sequences, determining the proximity alert apparatus integral power savings for each captured sequence regarding one or more operational states; applying an automated response to the captured sequence based on an optimum proximity alert apparatus integral power savings outcome; storing the captured sequence and the optimum proximity alert integral power savings outcome in a runtime memory within the proximity alert apparatus processor; identifying one or more captured sequences based on the proximity alert apparatus processor controlled integral power savings real time status associated with the optimum proximity alert integral power savings outcome event confronting the proximity alert apparatus processor controlled operational state; selecting a captured sequence from the one or more captured sequences, and the control method associated with each individual sequence; and executing the selected captured sequence for the controlled operational state integral power savings method in response to the operational state confronting the proximity alert apparatus.

2. The proximity alert apparatus of claim 1, wherein the program instructions further comprise instructions which load a second configuration value from the non-volatile memory based upon user input from the user input device and set the transmission power level, based on the loaded second configuration value, to a second power level that differs from the first power level.

3. The proximity alert apparatus of claim 1, wherein the program instructions further comprise instructions based upon an alarm or alert mitigation method.

4. The proximity alert apparatus of claim 1, wherein the proximity alert apparatus adapts to a user's environment and determines the most robust and stable frequencies for connecting the proximity alert apparatus with the protected device.

5. The proximity alert apparatus of claim 1, wherein the program instructions further comprise instructions which, upon pairing with the protected device, remotely control a protected device camera application with the proximity alert apparatus user input device and without disabling the protected device's keyboard.

6. The proximity alert apparatus of claim 1, wherein the user interface input device comprises a single button to: power on the proximity alert apparatus; control a paired protected device camera application shutter control; adjust an alert distance between the proximity alert apparatus and the protected device; adjust a preferred proximity device audible alert tune; set a proximity alert apparatus nap interval; and set a proximity alert apparatus home or travel mode.

7. The proximity alert apparatus of claim 1, wherein the means for visual output to a user comprises two light emitting diodes (LEDs), and wherein means for auditory output to a user comprises beeps and a selection from at least five audio alert tunes.

8. The proximity alert apparatus of claim 1, wherein the selected distance between the protected device and the proximity alert apparatus is adjustably scalable from 10 feet to 150 feet for triggering a selectable auditory alarm.

9. A system for proximity alert comprising a proximity alert apparatus comprising circuitry supporting at least one radio transceiver and one or more processors, wherein at least one processor stores program instructions to be executed by the processor, the program instructions comprising:
   A) loading a configuration value from a non-volatile memory processor and setting a transmission power level for the at least one radio transceiver, based on a loaded first configuration value, to a configuration power level from among a plurality of known power levels;
   B) providing a persistent and continuous radio frequency communication relationship utilizing Bluetooth Low Energy ("BLE") pairing and bonding between the proximity alert apparatus and a protected device comprising a corresponding radio transceiver;
   C) providing visual output and auditory output confirmation of successful pairing to a protected device;
   D) receiving notice of disconnect of link connectivity between the proximity alert apparatus or system and the protected device from an Open Systems Interconnection (OSI) Bluetooth Low Energy (BLE) link layer;

E) performing a state machine cycle depending upon input and output for at least six proximity alert apparatus operational states comprising:
  i) the system for proximity alert is near the protected device,
  ii) the system for proximity alert is separated from the protected device,
  iii) the system for proximity alert is connected to the protected device,
  iv) the system for proximity alert is still,
  v) the system for proximity alert is laid down, and
  vi) the system for proximity alert is picked up;
F) adjusting the system for proximity alert transmission power level a predetermined increment up or down from the plurality of known standard power levels based upon the system for proximity alert operational state;
G) adjusting the transmission power level of the system for proximity alert at least one radio transceiver up or down by the predetermined increment;
H) saving the system for proximity alert adjusted transmission power level to either a non-volatile memory or a volatile memory dependent on operational state;
I) triggering a selectable auditory system for proximity alert alarm output in response to the protected device being more than a selected distance from the system for proximity alert;
J) triggering an auditory system for proximity alert alarm output in response to the protected device being less than a selected distance from the system for proximity alert;
K) triggering a selectable auditory proximity alert system alarm output in response to a protracted period without link connectivity and historical lack of movement, and then movement; and
L) during runtime execution of the system for proximity alert running an application comprising configuration values during operational states of user inputs in response to one or more system for proximity alert operational states relating to proximity, time, and motion alert inputs and outputs; for individual captured sequences, determining the system for proximity alert integral power savings for each captured sequence regarding one or more operational states; applying an automated response to the captured sequence based on an optimum system for proximity alert integral power savings outcome; storing the captured sequence and the optimum proximity alert integral power savings outcome in a runtime memory within the system alert processor; identifying one or more captured sequences based on the system for proximity alert processor controlled integral power savings real time status associated with the optimum proximity alert integral power savings outcome event confronting the system for proximity alert processor controlled operational state; selecting a captured sequence from the one or more captured sequences, and the control method associated with each individual sequence; and executing the selected captured sequence for the controlled operational state integral power savings method in response to the operational state confronting the proximity alert system.

10. The system for proximity alert of claim 9, wherein the system for proximity alert further comprises a processor comprising non-volatile and volatile memory; a user input device; means for auditory output and visual output to a user; an accelerometer; and a replaceable, integral power source.

11. The system for proximity alert of claim 9, further comprising an alarm or alert mitigation method.

12. The system for proximity alert of claim 9, wherein the program instructions further comprise instructions which load a second configuration value from the non-volatile memory based upon user input from the user input device and set the transmission power level, based on the loaded second configuration value, to a second power level that differs from the first power level.

13. The system for proximity alert of claim 9, wherein the system for proximity alert adapts to a user's environment and determines the most robust and stable frequencies for connecting with the protected device.

14. The system for proximity alert of claim 9, wherein the program instructions further comprise instructions which, upon pairing with the protected device, remotely control a protected device camera application with the proximity alert user input device and without disabling the protected device's keyboard.

15. The system for proximity alert of claim 9, wherein the user interface input device comprises a single button to: power on the system for proximity alert; control a paired protected device camera application shutter control; adjust an alert distance between the system for proximity alert and the protected device; adjust a preferred system for proximity alert audible alert tune; set a system for proximity alert proximity device nap interval; and set a system for proximity alert home or travel mode.

16. The system for proximity alert of claim 9, wherein the means for visual output to a user comprises two light emitting diodes (LEDs), and wherein means for auditory output to a user comprises a piezo transducer comprising audio beeps and a selection from at least five audio alert tunes.

17. The system for proximity alert of claim 9, wherein the selected distance is adjustably scalable from 10 feet to 150 feet.

18. A non-transitory computer readable memory medium storing program instructions executable by processing circuitry of a proximity alert apparatus or system, the program instructions comprising the steps:
  A) loading a configuration value from a non-volatile memory processor and setting a transmission power level for at least one radio transceiver, based on a loaded first configuration value, to a configuration power level from among a plurality of known power levels;
  B) providing a persistent and continuous radio frequency communication relationship utilizing Bluetooth Low Energy ("BLE") pairing and bonding between the proximity alert apparatus and a protected device comprising a corresponding radio transceiver;
  C) providing visual output and auditory output confirmation of successful pairing to the protected device;
  D) receiving notice of disconnect of link connectivity between the proximity alert apparatus or system and the protected device from an Open Systems Interconnection (OSI) Bluetooth Low Energy (BLE) link layer;
  E) performing a state machine cycle depending upon input and output for at least six proximity alert apparatus operational states comprising:
    i) the proximity alert apparatus or system is near the protected device, ii) the proximity alert apparatus or system is separated from the protected device,
iii) the proximity alert apparatus or system is connected to the protected device,
iv) the proximity alert apparatus or system is still,
v) the proximity alert apparatus or system is laid down, and
vi) the proximity alert apparatus or system is picked up;

F) adjusting the proximity alert apparatus or system transmission power level, a predetermined increment up or down from the plurality of known standard power levels based upon the proximity alert apparatus or system operational state;

G) adjusting the transmission power level of the proximity alert apparatus or system at least one radio transceiver up or down by the predetermined increment;

H) saving the proximity alert apparatus or system adjusted transmission power level to either a non-volatile memory or a volatile memory dependent on operational state;

I) triggering a selectable auditory proximity alert apparatus or system alarm output in response to the protected device being more than a selected distance from the proximity alert apparatus or system;

J) triggering an auditory proximity alert apparatus or system alarm output in response to the protected device being less than a selected distance from the proximity alert apparatus or system;

K) triggering a selectable auditory proximity alert apparatus or system alarm output in response to a protracted period without link connectivity and historical lack of movement, and then movement; and L) during runtime execution of the proximity alert apparatus or system running an application comprising configuration values during operational states of user inputs in response to one or more proximity alert apparatus or system operational states relating to proximity, time, and motion alert inputs and outputs; for individual captured sequences, determining the proximity alert apparatus or system integral power savings for each captured sequence regarding one or more operational states; applying an automated response to the captured sequence based on an optimum proximity alert integral power savings outcome; storing the captured sequence and the optimum proximity alert integral power savings outcome in a runtime memory within the proximity alert apparatus or system processor; identifying one or more captured sequences based on the proximity alert apparatus or system processor controlled integral power savings real time status associated with the optimum proximity alert integral power savings outcome event confronting the proximity alert apparatus or system processor controlled operational state; selecting a captured sequence from the one or more captured sequences, and the control method associated with each individual sequence; and executing the selected captured sequence for the controlled operational state integral power savings method in response to the operational state confronting the proximity alert apparatus or system.

19. The non-transitory computer readable memory medium of claim 18, further comprising an alarm or alert mitigation method.

20. The non-transitory computer readable memory medium of claim 18, wherein a separated distance of the proximate alert apparatus or system from the protected device is adjustably scalable from 10 feet to 150 feet.

21. The non-transitory computer readable memory medium of claim 18, wherein the proximity alert apparatus or system adapts to a user's environment and determines the most robust and stable frequencies for connecting with the protected device.

* * * * *